(12) United States Patent
Wang et al.

(10) Patent No.: US 10,135,589 B2
(45) Date of Patent: Nov. 20, 2018

(54) INSERTING AND EXTRACTING PILOT SEQUENCES

(71) Applicant: Huawei Technologies Co., Ltd., Shenzhen (CN)

(72) Inventors: Yong Wang, Chengdu (CN); Xiaohu Tang, Chengdu (CN); Rui Ni, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 15/255,479

(22) Filed: Sep. 2, 2016

(65) Prior Publication Data

US 2016/0373226 A1 Dec. 22, 2016

Related U.S. Application Data

(63) Continuation of application No. PCT/CN2014/074022, filed on Mar. 25, 2014.

(51) Int. Cl.
  *H04L 5/00* (2006.01)
  *H04L 27/26* (2006.01)
  (Continued)

(52) U.S. Cl.
  CPC .......... *H04L 5/0048* (2013.01); *H04B 7/04* (2013.01); *H04B 7/0456* (2013.01);
  (Continued)

(58) Field of Classification Search
  CPC . H04L 5/0026; H04L 5/0048; H04L 27/2601; H04L 27/2613; H04B 7/04; H04B 7/0456
  See application file for complete search history.

(56) References Cited

U.S. PATENT DOCUMENTS 8,654,734 B2 * 2/2014 Chandrasekhar ..... H04W 72/02
  370/330
8,787,508 B2 * 7/2014 Ren ..................... H04L 5/1469
  375/346
(Continued)

FOREIGN PATENT DOCUMENTS

CN 1917394 A 2/2007
CN 101242214 A 8/2008
(Continued)

OTHER PUBLICATIONS

International Search Report in International Application No. PCT/CN2014/074022, dated Dec. 31, 2014; 4 pages.
(Continued)

*Primary Examiner* — Kevin Mew
(74) *Attorney, Agent, or Firm* — Fish & Richardson P.C.

(57) ABSTRACT

Embodiments of the present disclosure provide methods and devices for inserting and extracting a pilot sequence according to a pilot mapping indicating a location for inserting the pilot sequence in a plurality of time-frequency resources. One example method includes inserting, by a transmitter according to pilot mappings corresponding to $N_t$ transmit antenna ports by using $N_t$ orthogonal pilot sequences that are different from each other, a pilot sequence corresponding to each of the transmit antenna ports into OFDM symbols that are included in the pilot mapping corresponding to the transmit antenna port. There is a one-to-one correspondence between the $N_t$ pilot sequences and the $N_t$ transmit antenna ports of the transmitter, where $N_t$ is a positive integer greater than or equal to 2. The pilot mappings corresponding to the transmit antenna ports are the same among the $N_t$ transmit antenna ports.

16 Claims, 7 Drawing Sheets

A transmitter inserts, according to pilot mappings corresponding to $Nt$ transmit antenna ports by using $Nt$ orthogonal pilot sequences that are different from each other, a pilot sequence corresponding to each of the transmit antenna ports into OFDM symbols that are included in the pilot mapping corresponding to the transmit antenna port, where there is a one-to-one correspondence between the $Nt$ orthogonal pilot sequences and the $Nt$ transmit antenna ports of the transmitter, where $Nt$ is a positive integer greater than or equal to 2, and the pilot mappings corresponding to the transmit antenna ports are the same ⟶ 201

The transmitter sends the OFDM symbols into which the pilot sequence is inserted to a receiver ⟶ 202

(51) Int. Cl.
*H04B 7/04* (2017.01)
*H04B 7/0456* (2017.01)

(52) U.S. Cl.
CPC ........ *H04L 5/0026* (2013.01); *H04L 27/2601* (2013.01); *H04L 27/2613* (2013.01)

(56) References Cited

U.S. PATENT DOCUMENTS

| | | | |
|---|---|---|---|
| 2008/0212702 A1* | 9/2008 | Pan | H04B 7/0417 375/260 |
| 2010/0046412 A1 | 2/2010 | Varadarajan et al. | |
| 2010/0172427 A1 | 7/2010 | Kleider et al. | |
| 2011/0206147 A1* | 8/2011 | Hariharan | H04L 1/08 375/260 |
| 2011/0292825 A1* | 12/2011 | Lee, II | H04L 5/0023 370/252 |
| 2013/0044028 A1* | 2/2013 | Lea | H01Q 21/24 342/359 |
| 2013/0121304 A1* | 5/2013 | Nory | H04L 1/1861 370/330 |
| 2013/0343499 A1* | 12/2013 | Ren | H04L 5/1469 375/349 |
| 2014/0029428 A1* | 1/2014 | Lin | H04L 5/0048 370/235 |
| 2014/0140422 A1* | 5/2014 | Li | H04L 5/0051 375/260 |
| 2014/0302887 A1* | 10/2014 | Bashar | H04W 4/70 455/550.1 |
| 2014/0321296 A1* | 10/2014 | Balraj | H04L 5/0032 370/252 |

FOREIGN PATENT DOCUMENTS

| | | |
|---|---|---|
| CN | 101867403 A | 10/2010 |
| CN | 101931447 A | 12/2010 |
| CN | 102916920 A | 2/2013 |
| CN | 103581622 A | 2/2014 |
| WO | 2011015065 A1 | 2/2011 |
| WO | 2011157042 A1 | 12/2011 |

OTHER PUBLICATIONS

Chinese Office Action issued in Chinese Application No. 201480056716.1 dated Jul. 30, 2018, 14 pages.

* cited by examiner

A transmitter inserts, according to pilot mappings corresponding to $Nt$ transmit antenna ports by using $Nt$ orthogonal pilot sequences that are different from each other, a pilot sequence corresponding to each of the transmit antenna ports into OFDM symbols that are included in the pilot mapping corresponding to the transmit antenna port, where there is a one-to-one correspondence between the $Nt$ orthogonal pilot sequences and the $Nt$ transmit antenna ports of the transmitter, where $Nt$ is a positive integer greater than or equal to 2, and the pilot mappings corresponding to the transmit antenna ports are the same ~ 201

The transmitter sends the OFDM symbols into which the pilot sequence is inserted to a receiver ~ 202

INSERTING AND EXTRACTING PILOT SEQUENCES

CROSS REFERENCE TO RELATED APPLICATIONS

This application is a continuation of International Patent Application No. PCT/CN2014/074022, filed on Mar. 25, 2014, which is hereby incorporated by reference in its entirety.

TECHNICAL FIELD

Embodiments of the present disclosure relate to communications technologies, and in particular, to methods and devices for inserting and extracting a pilot sequence.

BACKGROUND

A multiple-input multiple-output (MIMO) technology is an important means to improve a channel capacity of a wireless communications system. In an ideal situation, a capacity of a system including Nt transmit antennas and Nr receive antennas may be approximately improved by Nt×Nr times. Any receive antenna instantly receives a superposed signal from the Nt transmit antennas. Each receive antenna needs to estimate channel information of each transmit antenna according to the superposed signal. Before estimating the channel information of each transmit antenna, the receive antenna first needs to identify different transmit antenna ports, where the different transmit antenna ports use different reference signals (RSs), and the receive antenna mainly identifies the transmit antenna ports by using the reference signals.

In a Long Term Evolution (LTE) system, transmit antenna ports are differentiated by using a method of time-frequency orthogonality, that is, for different transmit antennas, RSs are inserted at different time points and frequencies. FIG. 1 is a mapping (mapping) of reference signals when an LTE system uses four transmit antennas. As shown in FIG. 1, the mapping of the reference signals is a two-dimensional mapping, and includes two dimensions: time and frequency dimensions. Four transmit antennas exist at a transmit end, and are separately an antenna 0, an antenna 1, an antenna 2, and an antenna 3. $T_0$ represents a time-frequency point at which the antenna 0 inserts a reference signal, $T_1$ represents a time-frequency point at which the antenna 1 inserts a reference signal, $T_2$ represents a time-frequency point at which the antenna 2 inserts a reference signal, $T_3$ represents a time-frequency point at which the antenna 3 inserts a reference signal, and time-frequency points other than the time-frequency points at which the reference signals are inserted are time-frequency points at which user data is inserted. As can be shown from FIG. 1, the time-frequency points at which the antennas send the reference signals are different from each other, so that the different transmit antennas can be differentiated according to the time-frequency points, but the reference signals sent by the antennas are the same.

Time-frequency resources occupied in sending reference signals increase in direct proportion as a quantity of MIMO transmit antennas increases. A time-frequency resource allocated to a transmit antenna for sending a reference signal cannot be used by another antenna, which can cause a waste of time-frequency resources, and reduce spectral efficiency and a throughput of the entire system.

SUMMARY

Embodiments of the present disclosure provide methods and devices for inserting and extracting a pilot sequence, which can reduce time-frequency resources occupied in sending pilot sequences, thereby improving spectral efficiency and a throughput of an entire system.

A first aspect of the present disclosure provides a method for inserting a pilot sequence. The method includes inserting, by a transmitter according to pilot mappings corresponding to $N_t$ transmit antenna ports by using $N_t$ orthogonal pilot sequences that are different from each other, a pilot sequence corresponding to each of the transmit antenna ports into orthogonal frequency division multiplexing OFDM symbols that are included in the pilot mapping corresponding to the transmit antenna port, where there is a one-to-one correspondence between the $N_t$ pilot sequences and the $N_t$ transmit antenna ports of the transmitter, where $N_t$ is a positive integer greater than or equal to 2, and the pilot mappings corresponding to the transmit antenna ports are the same; and sending, by the transmitter, the OFDM symbols into which the pilot sequence is inserted to a receiver.

With reference to the first aspect of the present disclosure, in a first possible implementation manner of the first aspect of the present disclosure, a length of each of the pilot sequences is greater than or equal to a product of the transmit antenna port quantity $N_t$ and a multipath quantity, and the multipath quantity is a multipath quantity of a radio channel between the transmitter and the receiver.

With reference to the first aspect of the present disclosure and the first possible implementation manner of the first aspect of the present disclosure, in a second possible implementation manner of the first aspect of the present disclosure, a quantity of the OFDM symbols included in the pilot mapping is $$M \le \frac{T_c}{T_{OFDM}},$$

where $T_c$ is a coherence time, $$T_c = \frac{1}{4D_s}, D_s$$

is a Doppler frequency shift, and $T_{OFDM}$ is OFDM symbol duration.

With reference to the first aspect of the present disclosure, in a third possible implementation manner of the first aspect of the present disclosure, a quantity of pilot elements of the pilot sequence that are inserted into each OFDM symbol is equal, and the quantity of the pilot elements is a ratio of a length of the pilot sequence to a quantity of the OFDM symbols included in the pilot mapping.

With reference to the first aspect of the present disclosure, in a fourth possible implementation manner of the first aspect of the present disclosure, a quantity of pilot elements of the pilot sequence that are inserted into each OFDM symbol is unequal.

With reference to the third possible implementation manner of the first aspect of the present disclosure, in a fifth possible implementation manner of the first aspect of the present disclosure, when the quantity of the pilot elements that are inserted into each OFDM symbol is equal, the inserting, by a transmitter according to pilot mappings corresponding to transmit antenna ports, a pilot sequence corresponding to each of the transmit antenna ports into orthogonal frequency division multiplexing OFDM symbols that are included in the pilot mapping corresponding to the transmit antenna port includes inserting, by the transmitter according to the pilot mappings corresponding to the transmit antenna ports, the $n^{th}$ pilot element of the pilot sequence corresponding to each of the transmit antenna ports into the $q^{th}$ subcarrier of the $p^{th}$ OFDM symbol of the pilot mapping corresponding to the transmit antenna port, where $$P = \left\lfloor \frac{n-1}{N/M} \right\rfloor + 1,$$

q=mod (n−1, N/M)+p, n=1, ..., N, p=1, ..., M, and q=1, ..., $N_{FFT}$, where N is the length of the pilot sequence, M is the quantity of the OFDM symbols included in the pilot mapping, and $N_{FFT}$ is a quantity of subcarriers included in the pilot mapping.

With reference to the first aspect of the present disclosure and the first to fifth possible implementation manners of the first aspect, in a sixth possible implementation manner of the first aspect of the present disclosure, before the inserting, by a transmitter according to pilot mappings corresponding to $N_t$ transmit antenna ports by using $N_t$ orthogonal pilot sequences that are different from each other, a pilot sequence corresponding to each of the transmit antenna ports into orthogonal frequency division multiplexing OFDM symbols that are included in the pilot mapping corresponding to the transmit antenna port, the method further includes generating, by the transmitter according to the following formula, the $N_t$ orthogonal pilot sequences that are different from each other:

$$\text{pilot}(m, n) = e^{\frac{-j2\pi(m-1)(n-1)N_{taps}}{N_{FFT}}},$$

where pilot(m,n) represents the $m^{th}$ pilot element of a pilot sequence corresponding to the $n^{th}$ transmit antenna port, m=1, ..., $N_{FFT}$, n=1, ..., Nt, $N_t$ is the transmit antenna port quantity of the transmitter, $N_{FFT}$ is the quantity of the subcarriers included in the pilot mapping, and $N_{taps}$ is a tap coefficient of the receiver.

With reference to the sixth possible implementation manner of the first aspect of the present disclosure, in a seventh possible implementation manner of the first aspect of the present disclosure, before the generating, by the transmitter according to the following formula, the $N_t$ orthogonal pilot sequences that are different from each other, the method further includes acquiring, by the transmitter, the tap coefficient of the receiver.

With reference to the sixth possible implementation manner of the first aspect of the present disclosure, in an eighth possible implementation manner of the first aspect of the present disclosure, before the generating, by the transmitter, the $N_t$ orthogonal pilot sequences that are different from each other, the method further includes acquiring, by the transmitter, the multipath quantity, the Doppler frequency shift, and the OFDM symbol duration.

A second aspect of the present disclosure provides a method for extracting a pilot sequence. The method includes receiving, by a receiver, orthogonal frequency division multiplexing OFDM symbols, into which a pilot sequence is inserted, sent by a transmitter; extracting, by the receiver from the OFDM symbols according to pilot mappings corresponding to transmit antenna ports of the transmitter, pilot sequences superposed at the transmit antenna ports, where the pilot mappings corresponding to the transmit antenna ports are the same, and a transmit antenna port quantity $N_t$ of the transmitter is a positive integer greater than or equal to 2; identifying, by the receiver from the superposed pilot sequences, a pilot sequence corresponding to each of the transmit antenna ports, where the pilot sequences corresponding to the transmit antenna ports are different from each other and are orthogonal; and performing, by the receiver, channel estimation on each of the transmit antenna ports according to the pilot sequence corresponding to each of the transmit antenna ports.

With reference to the second aspect of the present disclosure, in a first possible implementation manner of the second aspect of the present disclosure, the identifying, by the receiver from the superposed pilot sequences, a pilot sequence corresponding to each of the transmit antenna ports includes calculating, by the receiver according to a tap coefficient, a quantity of subcarriers included in the pilot mapping, and the transmit antenna port quantity $N_t$, a pseudo inverse matrix corresponding to each of the transmit antenna ports, where the pseudo inverse matrix corresponding to each of the transmit antenna ports is orthogonal; and identifying, by the receiver from the superposed pilot sequences according to the pseudo inverse matrix corresponding to each of the transmit antenna ports, the pilot sequence corresponding to each of the transmit antenna ports; and the performing, by the receiver, channel estimation on each of the transmit antenna ports according to the pilot sequence corresponding to each of the transmit antenna ports includes determining, by the receiver, a frequency domain transfer function of each of the transmit antenna ports according to the pilot sequence corresponding to each of the transmit antenna ports.

With reference to the first possible implementation manner of the second aspect of the present disclosure, in a second possible implementation manner of the second aspect of the present disclosure, the calculating, by the receiver according to a tap coefficient, a quantity of subcarriers included in the pilot mapping, and the transmit antenna port quantity $N_t$, a pseudo inverse matrix corresponding to each of the transmit antenna ports includes calculating, by the receiver, a matrix A according to the following formulas:

$$A = [a_{m,n}] \text{ and } a_{m,n} = e^{\frac{-j2\pi mn}{N_{FFT}}},$$

where m=1, ..., $N_{FFT}$, n=1, ..., $N_{taps}$, $N_{FFT}$ is the quantity of the subcarriers included in the pilot mapping, and $N_{taps}$ is the tap coefficient of the receiver; separately acquiring, by the receiver, the $K^{th}$ column of the matrixes A to generate $N_t$ diagonal matrixes, and separately multiplying the diagonal matrixes by the matrix A to obtain matrixes $N_t$ matrixes $B_k$, where k=1, ..., Nt; separately generating, by the receiver, a generator matrix $C_k$ according to the matrix $B_k$, where $C_k = \{B_1, ..., B_k\}$; and calculating, by the receiver according to the following formula, a pseudo inverse matrix $D_k$ corresponding to each of the transmit antenna ports: $D_k = (C'_k * C_k)^{-1} * C'_k$, where $C'_k$ is a conjugate transpose matrix of the matrix $C_k$, and $(X)^{-1}$ represents inversion on a matrix x.

With reference to the first and second possible implementation manners of the second aspect of the present disclosure, in a third possible implementation manner of the second aspect of the present disclosure, before the calculating, by the receiver according to a tap coefficient, a quantity of subcarriers included in the pilot mapping, and the transmit antenna port quantity $N_t$, a pseudo inverse matrix corresponding to each of the transmit antenna ports, the method further includes acquiring, by the receiver, the quantity of the subcarriers included in the pilot mapping and the transmit antenna port quantity $N_t$.

A third aspect of the present disclosure provides a transmitter including an insertion module, configured to insert, according to pilot mappings corresponding to $N_t$ transmit antenna ports by using $N_t$ orthogonal pilot sequences that are different from each other, a pilot sequence corresponding to each of the transmit antenna ports into orthogonal frequency division multiplexing OFDM symbols that are included in the pilot mapping corresponding to the transmit antenna port, where there is a one-to-one correspondence between the $N_t$ pilot sequences and the $N_t$ transmit antenna ports of the transmitter, where $N_t$ is a positive integer greater than or equal to 2, and the pilot mappings corresponding to the transmit antenna ports are the same; and a sending module, configured to send the OFDM symbols into which the insertion module inserts the pilot sequence to a receiver.

With reference to the third aspect of the present disclosure, in a first possible implementation manner of the third aspect of the present disclosure, a length of each of the pilot sequences is greater than or equal to a product of the transmit antenna port quantity $N_t$ and a multipath quantity, and the multipath quantity is a multipath quantity of a radio channel between the transmitter and the receiver.

With reference to the third aspect of the present disclosure and the first possible implementation manner of the third aspect of the present disclosure, in a second possible implementation manner of the third aspect of the present disclosure, a quantity of the OFDM symbols included in the pilot mapping is $$M \le \frac{T_c}{T_{OFDM}},$$

where $T_c$ is a coherence time, $$T_c = \frac{1}{4D_s}, D_s$$

is a Doppler frequency shift, and $T_{OFDM}$ is OFDM symbol duration.

With reference to the third aspect of the present disclosure, in a third possible implementation manner of the third aspect of the present disclosure, a quantity of pilot elements of the pilot sequence that are inserted into each OFDM symbol is equal, and the quantity of the pilot elements is a ratio of a length of the pilot sequence to a quantity of the OFDM symbols included in the pilot mapping.

With reference to the third aspect of the present disclosure, in a fourth possible implementation manner of the third aspect of the present disclosure, a quantity of pilot elements of the pilot sequence that are inserted into each OFDM symbol is unequal.

With reference to the third possible implementation manner of the third aspect of the present disclosure, in a fifth possible implementation manner of the third aspect of the present disclosure, when the quantity of the pilot elements that are inserted into each OFDM symbol is equal, the insertion module is specifically configured to insert, according to the pilot mappings corresponding to the transmit antenna ports, the $n^{th}$ pilot element of the pilot sequence corresponding to each of the transmit antenna ports into the $q^{th}$ subcarrier of the $n^{th}$ OFDM symbol of the pilot mapping corresponding to the transmit antenna port, where $$P = \left\lfloor \frac{n-1}{N/M} \right\rfloor + 1,$$

$q=\text{mod}(n-1, N/M)+p$, $n=1, \ldots, N$, $p=1, \ldots, M$, and $q=1, \ldots, N_{FFT}$, where N is the length of the pilot sequence, M is the quantity of the OFDM symbols included in the pilot mapping, and $N_{FFT}$ is a quantity of subcarriers included in the pilot mapping.

With reference to the third aspect of the present disclosure and the first to fifth possible implementation manners of the third aspect, in a sixth possible implementation manner of the third aspect of the present disclosure, the transmitter further includes a generation module, configured to generate, according to the following formula, the $N_t$ orthogonal pilot sequences that are different from each other:

$$\text{pilot}(m, n) = e^{\frac{-j2\pi(m-1)(n-1)N_{taps}}{N_{FFT}}},$$

where pilot(m,n) represents the $m^{th}$ pilot element of a pilot sequence corresponding to the $n^{th}$ transmit antenna port, $m=1, \ldots, N_{FFT}$, $n=1, \ldots, Nt$, $N_t$ is the transmit antenna port quantity of the transmitter, $N_{FFT}$ is the quantity of the subcarriers included in the pilot mapping, and $N_{taps}$ is a tap coefficient of the receiver.

With reference to the sixth possible implementation manner of the third aspect of the present disclosure, in a seventh possible implementation manner of the third aspect of the present disclosure, the generation module is further configured to: acquire the tap coefficient of the receiver.

With reference to the sixth possible implementation manner of the third aspect of the present disclosure, in an eighth possible implementation manner of the third aspect of the present disclosure, the generation module is further configured to: acquire the multipath quantity, the Doppler frequency shift, and the OFDM symbol duration.

A fourth aspect of the present disclosure provides a receiver, including a receiving module, configured to receive orthogonal frequency division multiplexing OFDM symbols, into which a pilot sequence is inserted, sent by a transmitter; an extraction module, configured to extract, from the OFDM symbols received by the receiving module, according to pilot mappings corresponding to transmit antenna ports of the transmitter, pilot sequences superposed at the transmit antenna ports, where the pilot mappings corresponding to the transmit antenna ports are the same, and a transmit antenna port quantity $N_t$ of the transmitter is a positive integer greater than or equal to 2; an identification module, configured to identify, from the superposed pilot sequences extracted by the extraction module, a pilot sequence corresponding to each of the transmit antenna ports, where the pilot sequences corresponding to the transmit antenna ports are different from each other and are orthogonal; and a channel estimation module, configured to perform channel estimation on each of the transmit antenna ports according to the pilot sequence that is corresponding to each of the transmit antenna ports and that is identified by the identification module.

With reference to the fourth aspect of the present disclosure, in a first possible implementation manner of the fourth aspect of the present disclosure, the identification module is specifically configured to calculate, according to a tap coefficient, a quantity of subcarriers included in the pilot mapping, and the transmit antenna port quantity $N_t$, a pseudo inverse matrix corresponding to each of the transmit antenna ports, where the pseudo inverse matrix corresponding to each of the transmit antenna ports is orthogonal; and identify, from the superposed pilot sequences according to the pseudo inverse matrix corresponding to each of the transmit antenna ports, the pilot sequence corresponding to each of the transmit antenna ports; and the channel estimation module is specifically configured to: determine a frequency domain transfer function of each of the transmit antenna ports according to the pilot sequence corresponding to each of the transmit antenna ports.

With reference to the first possible implementation manner of the fourth aspect of the present disclosure, in a second possible implementation manner of the fourth aspect of the present disclosure, the identification module is specifically configured to calculate a matrix A according to the following formulas:

$$A = [a_{m,n}] \text{ and } a_{m,n} = e^{\frac{-j2\pi mn}{N_{FFT}}},$$

where m=1, ..., $N_{FFT}$, n=1, ..., $N_{taps}$, $N_{FFT}$ is the quantity of the subcarriers included in the pilot mapping, and $N_{taps}$ is the tap coefficient of the receiver; separately acquire the $K^{th}$ column of the matrixes A to generate $N_t$ diagonal matrixes, and separately multiply the diagonal matrixes by the matrix A to obtain $N_t$ matrixes $B_k$, where k=1, ..., Nt; separately generate a generator matrix $C_k$ according to the matrix $B_k$, where $C_k = \{B_1, ..., B_k\}$; and calculate, according to the following formula, a pseudo inverse matrix $D_k$ corresponding to each of the transmit antenna ports: $D_k = (C'_k * C_k)^{-1} * C'_k$, where $C'_k$ is a conjugate transpose matrix of the matrix $C_k$, and $(X)^{-1}$ represents inversion on a matrix x.

With reference to the first and second possible implementation manners of the fourth aspect of the present disclosure, in a third possible implementation manner of the fourth aspect of the present disclosure, the receiver further includes an acquiring module, configured to acquire the quantity of the subcarriers included in the pilot mapping and the transmit antenna port quantity $N_t$.

A fifth aspect of the present disclosure provides a transmitter, including: a processor, a memory, and a sender, where the memory is configured to store an instruction, and the processor is configured to execute the instruction stored in the memory, where the processor is configured to insert, according to pilot mappings corresponding to $N_t$ transmit antenna ports by using $N_t$ orthogonal pilot sequences that are different from each other, a pilot sequence corresponding to each of the transmit antenna ports into orthogonal frequency division multiplexing OFDM symbols that are included in the pilot mapping corresponding to the transmit antenna port, where there is a one-to-one correspondence between the $N_t$ pilot sequences and the $N_t$ transmit antenna ports of the transmitter, where $N_t$ is a positive integer greater than or equal to 2, and the pilot mappings corresponding to the transmit antenna ports are the same; and the sender is configured to send the OFDM symbols into which the pilot sequence is inserted to a receiver.

With reference to the fifth aspect of the present disclosure, in a first possible implementation manner of the fifth aspect of the present disclosure, a length of each of the pilot sequences is greater than or equal to a product of the transmit antenna port quantity $N_t$ and a multipath quantity, and the multipath quantity is a multipath quantity of a radio channel between the transmitter and the receiver.

With reference to the fifth aspect of the present disclosure and the first possible implementation manner of the fifth aspect of the present disclosure, in a second possible implementation manner of the fifth aspect of the present disclosure, a quantity of the OFDM symbols included in the pilot mapping is $$M \le \frac{T_c}{T_{OFDM}},$$

where $T_c$ is a coherence time, $$T_c = \frac{1}{4D_s}, D_s$$

is a Doppler frequency shift, and $T_{OFDM}$ is OFDM symbol duration.

With reference to the fifth aspect of the present disclosure, in a third possible implementation manner of the fifth aspect of the present disclosure, a quantity of pilot elements of the pilot sequence that are inserted into each OFDM symbol is equal, and the quantity of the pilot elements is a ratio of a length of the pilot sequence to a quantity of the OFDM symbols included in the pilot mapping.

With reference to the fifth aspect of the present disclosure, in a fourth possible implementation manner of the fifth aspect of the present disclosure, a quantity of pilot elements of the pilot sequence that are inserted into each OFDM symbol is unequal.

With reference to the third possible implementation manner of the fifth aspect of the present disclosure, in a fifth possible implementation manner of the fifth aspect of the present disclosure, when the quantity of the pilot elements that are inserted into each OFDM symbol is equal, the processor is specifically configured to insert, according to the pilot mappings corresponding to the transmit antenna ports, the $n^{th}$ pilot element of the pilot sequence corresponding to each of the transmit antenna ports into the $q^{th}$ subcarrier of the $p^{th}$ OFDM symbol of the pilot mapping corresponding to the transmit antenna port, where $$P = \left\lfloor \frac{n-1}{N/M} \right\rfloor + 1,$$

q=mod(n−1, N/M)+p, n=1, ..., N, p=1, ..., M, and q=1, ..., $N_{FFT}$, where N is the length of the pilot sequence, M is the quantity of the OFDM symbols included in the pilot mapping, and $N_{FFT}$ is a quantity of subcarriers included in the pilot mapping.

With reference to the fifth aspect of the present disclosure and the first to fifth possible implementation manners of the fifth aspect, in a sixth possible implementation manner of the fifth aspect of the present disclosure, the processor is further configured to: before using the $N_t$ orthogonal pilot sequences that are different from each other, generate, according to the following formula, the $N_t$ orthogonal pilot sequences that are different from each other:

$$\text{pilot}(m, n) = e^{\frac{-j2\pi(m-1)(n-1)N_{taps}}{N_{FFT}}},$$

where pilot(m,n) represents the $m^{th}$ pilot element of a pilot sequence corresponding to the $n^{th}$ transmit antenna port, $m=1, \ldots, N_{FFT}$, $n=1, \ldots, Nt$, $N_t$ is the transmit antenna port quantity of the transmitter, $N_{FFT}$ is the quantity of the subcarriers included in the pilot mapping, and $N_{taps}$ is a tap coefficient of the receiver.

With reference to the sixth possible implementation manner of the fifth aspect of the present disclosure, in a seventh possible implementation manner of the fifth aspect of the present disclosure, the processor is further configured to: before generating the $N_t$ orthogonal pilot sequences that are different from each other, acquire the tap coefficient of the receiver.

With reference to the sixth possible implementation manner of the fifth aspect of the present disclosure, in an eighth possible implementation manner of the fifth aspect of the present disclosure, the processor is further configured to: before generating the $N_t$ orthogonal pilot sequences that are different from each other, acquire the multipath quantity, the Doppler frequency shift, and the OFDM symbol duration.

A sixth aspect of the present disclosure provides a receiver, including: a processor, a memory, and a receiving device, where the memory is configured to store an instruction, and the processor is configured to execute the instruction stored in the memory, where the receiving device is configured to receive orthogonal frequency division multiplexing OFDM symbols, into which a pilot sequence is inserted, sent by a transmitter; the processor is configured to extract, from the OFDM symbols according to pilot mappings corresponding to transmit antenna ports of the transmitter, pilot sequences superposed at the transmit antenna ports, where the pilot mappings corresponding to the transmit antenna ports are the same, and a transmit antenna port quantity $N_t$ of the transmitter is a positive integer greater than or equal to 2; the processor is further configured to: identify, from the superposed pilot sequences, a pilot sequence corresponding to each of the transmit antenna ports, where the pilot sequences corresponding to the transmit antenna ports are different from each other and are orthogonal; and the processor is further configured to: perform channel estimation on each of the transmit antenna ports according to the pilot sequence corresponding to each of the transmit antenna ports.

With reference to the sixth aspect of the present disclosure, in a first possible implementation manner of the sixth aspect of the present disclosure, when identifying, from the superposed pilot sequences, the pilot sequence corresponding to each of the transmit antenna ports, the processor is specifically configured to: calculate, according to a tap coefficient, a quantity of subcarriers included in the pilot mapping, and the transmit antenna port quantity $N_t$, a pseudo inverse matrix corresponding to each of the transmit antenna ports, where the pseudo inverse matrix corresponding to each of the transmit antenna ports is orthogonal; and identify, from the superposed pilot sequences according to the pseudo inverse matrix corresponding to each of the transmit antenna ports, the pilot sequence corresponding to each of the transmit antenna ports; and when performing channel estimation on each of the transmit antenna ports according to the pilot sequence corresponding to each of the transmit antenna ports, the processor is specifically configured to determine a frequency domain transfer function of each of the transmit antenna ports according to the pilot sequence corresponding to each of the transmit antenna ports.

With reference to the first possible implementation manner of the sixth aspect of the present disclosure, in a second possible implementation manner of the sixth aspect of the present disclosure, when calculating, according to the tap coefficient, the quantity of subcarriers included in the pilot mapping, and the transmit antenna port quantity $N_t$, the pseudo inverse matrix corresponding to each of the transmit antenna ports, the processor is specifically configured to calculate a matrix A according to the following formulas:

$$A = [a_{m,n}] \text{ and } a_{m,n} = e^{\frac{-j2\pi mn}{N_{FFT}}},$$

where $m=1, \ldots, N_{FFT}$, $n=1, \ldots, N_{taps}$, $N_{FFT}$ is the quantity of the subcarriers included in the pilot mapping, and $N_{taps}$ is the tap coefficient of the receiver; separately acquire the $K^{th}$ column of the matrixes A to generate $N_t$ diagonal matrixes, and separately multiply the diagonal matrixes by the matrix A to obtain $N_t$ matrixes $B_k$, where $k=1, \ldots, Nt$; separately generate a generator matrix $C_k$ according to the matrix $B_k$, where $C_k=\{B_1, \ldots, B_k\}$; and calculate, according to the following formula, a pseudo inverse matrix $D_k$ corresponding to each of the transmit antenna ports: $D_k=(C'_k*C_k)^{-1}*C'_k$, where $C'_k$ is a conjugate transpose matrix of the matrix $C_k$, and $(X)^{-1}$ represents inversion on a matrix x.

With reference to the first and second possible implementation manners of the sixth aspect of the present disclosure, in a third possible implementation manner of the sixth aspect of the present disclosure, before calculating, according to the tap coefficient, the quantity of subcarriers included in the pilot mapping, and the transmit antenna port quantity $N_t$, the pseudo inverse matrix corresponding to each of the transmit antenna ports, the processor is further configured to acquire the quantity of the subcarriers included in the pilot mapping and the transmit antenna port quantity $N_t$.

In the methods and devices for inserting and extracting a pilot sequence provided in some embodiments of the present disclosure, different transmit antenna ports are differentiated by using multiple orthogonal pilot sequences, and there is a one-to-one correspondence between the pilot sequences and the transmit antenna ports. Because the different transmit antenna ports are differentiated by using the orthogonal pilot sequences, the transmit antenna ports may use completely same pilot mappings. So time-frequency resources occupied in sending pilot sequences can be reduced, and the time-frequency resources occupied by the pilot sequences may not increase as transmit antenna ports of a MIMO system increase. wherein some instances, regardless of how many transmit antenna ports are added, only orthogonal pilot sequences need to be added, and no time-frequency resource needs to be added, thereby improving spectral efficiency and a throughput of the entire system.

BRIEF DESCRIPTION OF DRAWINGS

To describe the technical solutions in some embodiments of the present disclosure more clearly, the following briefly describes the accompanying drawings required for describing the embodiments. Apparently, the accompanying drawings in the following description show some embodiments of the present disclosure, and a person of ordinary skill in the art may still derive other drawings from these accompanying drawings without creative efforts.

FIG. 3 is a flowchart of a method for inserting a pilot sequence according to an embodiment of the present disclosure;

DESCRIPTION OF EMBODIMENTS

To make the objectives, technical solutions, and advantages of some embodiments of the present disclosure clearer, the following describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 2:
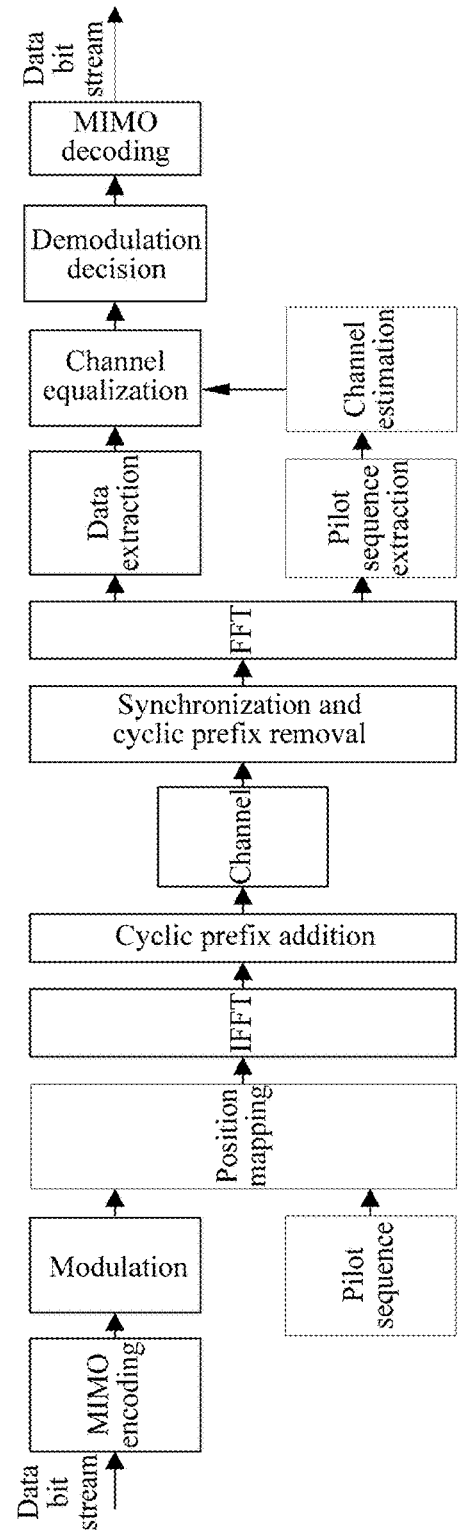
FIG. 2 is a schematic diagram of a basic processing procedure according to an embodiment of the present disclosure.

Before the embodiments of the present disclosure are described, application scenarios of the embodiments of the present disclosure are described first. The present disclosure is mainly applied to a multiple-input multiple-output orthogonal frequency division multiplexing (MIMO-OFDM) system. FIG. 2 is a schematic diagram of an example basic processing procedure of the present disclosure. As shown in FIG. 2, the example basic processing procedure mainly includes the following steps:

At step 101, an encoder of a transmitter performs channel coding according to a preset MIMO encoding policy, and outputs a coded signal.

At step 102, a modulator of the transmitter modulates, according to a preset constellation diagram, a code stream of the coded signal output by the encoder into two I/O complex signals, and outputs the complex signals to a position mapping module.

At step 103, a transmit antenna of the transmitter uses orthogonal pilot sequences according to a preset rule, and outputs the pilot sequences to the position mapping module.

At step 104, the position mapping module of the transmitter inserts, according to a pilot mapping, the complex signals output by the modulator and the pilot sequences output by the transmit antenna, into corresponding time-frequency points, and outputs a frequency domain signal obtained after the insertion.

At step 105, an inverse fast Fourier transformation (IFFT) module of the transmitter performs IFFT transformation on the frequency domain signal output by the position mapping module, and outputs a time-domain signal obtained through transformation.

At step 106, each transmit antenna of the transmitter adds a cyclic prefix ahead of the time-domain signal output by the IFFT module.

At step 107, each transmit antenna of the transmitter transmits a signal to which the cyclic prefix is added, where signals transmitted by multiple transmit antennas are superposed in a time domain after passing through a radio channel.

At step 108, a receive antenna of a receiver receives the superposed signal sent by the multiple transmit antennas, performs operations of time synchronization and cyclic prefix removal, and temporally stores and outputs OFDM symbols in a pilot mapping, where the OFDM symbol is the time-domain signal.

At step 109, a fast Fourier transformation (FFT) module of the receiver transforms the time-domain signal output by the receive antenna, into the frequency domain signal by means of FFT transformation.

At step 110, the receiver extracts, according to the pilot mapping that is the same as that of the transmitter, a superposed pilot sequence from a pilot insertion position of the frequency domain signal output by the FFT module.

At step 111, the receiver estimates radio channel status information from each transmit antenna to this receive antenna according to a particular algorithm by using the pilot sequence of the superposed signal, and outputs the radio channel status information of each transmit antenna.

At step 112, the receiver extracts, according to the pilot mapping that is the same as that of the transmitter, useful data from a non-pilot insertion position of the frequency domain signal output by the FFT module.

At step 113, the receiver performs channel equalization according to the radio channel status information of each transmit antenna obtained by means of estimation in step 111 and the useful data extracted in step 112.

At step 114, a demodulator of the receiver performs signal demodulation by using a constellation diagram that is the same as that of the modulator, and outputs a demodulated signal.

At step 115, a MIMO decoding module of the receiver performs a MIMO decoding operation according to the demodulated signal output by the demodulator, and sends a decoded bit stream to an upper-layer protocol stack.

The foregoing steps form a typical MIMO-OFDM basic processing procedure, and a method for inserting a pilot sequence provided in the present disclosure is described in detail below by using specific embodiments.

FIG. 3 is a flowchart of a method for inserting a pilot sequence according to an embodiment of the present disclosure. As shown in FIG. 3, the method in this embodiment may include:

At 201, a transmitter inserts, according to pilot mappings corresponding to $N_t$ transmit antenna ports by using $N_t$ orthogonal pilot sequences that are different from each other, a pilot sequence corresponding to each of the transmit antenna ports into OFDM symbols that are included in the pilot mapping corresponding to the transmit antenna port. There is a one-to-one correspondence between the $N_t$ pilot sequences and the $N_t$ transmit antenna ports of the transmitter. $N_t$ is a positive integer greater than or equal to 2, and the pilot mappings corresponding to the transmit antenna ports are the same.

The transmitter has $N_t$ transmit antenna ports in total. In this illustrated example, the transmit antenna port is a logical port, and is not equivalent to a physical antenna of the transmitter. In some instances, one physical antenna corresponds to one transmit antenna port, but in some cases, one physical antenna may correspond to multiple transmit antenna ports, which are not limited in the present disclosure.

In this embodiment, each pilot sequence corresponds to one transmit antenna port, that is, the pilot sequences used by the transmit antenna ports are orthogonal. The transmitter may generate the pilot sequence in any existing manner, and a manner for generating the pilot sequence is not limited in the present disclosure.

The pilot mapping can be a two-dimensional pilot mapping, and include two dimensions: time and frequency dimensions. In the frequency dimension, each frequency corresponds to one subcarrier, and in the time dimension, each time unit corresponds to one OFDM symbol. A quantity of the OFDM symbols included in the pilot mapping refers to a total quantity of OFDM symbols in the time dimension of the pilot mapping, and a quantity of subcarriers included in the pilot mapping refers to a total quantity of subcarriers in the frequency dimension of the pilot mapping.

The transmitter can separately insert pilot elements of the pilot sequence into the OFDM symbols of the pilot mapping according to the pilot mapping, where each pilot sequence includes multiple pilot elements, and a length of the pilot sequence is equal to a quantity of the pilot elements included in this pilot sequence. In a manner, a quantity of pilot elements of the pilot sequence that are inserted into each OFDM symbol is equal, that is, the transmitter evenly inserts the pilot elements of the pilot sequence into each OFDM symbol, and the quantity of the pilot elements is a ratio of the length of the pilot sequence to the quantity of the OFDM symbols included in the pilot mapping. In another manner, a quantity of pilot elements of the pilot sequence that are inserted into each OFDM symbol is unequal. A manner for inserting the pilot sequence is not limited in the present disclosure.

In this embodiment, the multiple transmit antenna ports are mainly differentiated according to orthogonality of the pilot sequences; therefore, the transmit antenna ports may send the pilot sequences by using a same time-frequency point. That is, the transmit antenna ports may use the same pilot mappings, such that time-frequency resources occupied in sending pilot sequences are reduced, and the utilization of the time-frequency resource is improved. In other words, the solution described herein avoids the waste of time-frequency resources when the transmit antenna ports use different pilot mappings due to having multiple transmit antenna ports differentiated by using different time-frequency points, where one time-frequency point can be used by only one transmit antenna port.

At 202, the transmitter sends the OFDM symbols into which the pilot sequence is inserted to a receiver.

The transmitter sends the OFDM symbols into which the pilot sequence is inserted to the receiver, so that the receiver extracts, from the OFDM symbols, pilot sequences superposed at the transmit antenna ports, and performs channel estimation on each of the transmit antenna ports according to the superposed pilot sequence.

In the method provided in this embodiment, a receiver differentiates different transmit antenna ports by using multiple orthogonal pilot sequences, and there is a one-to-one correspondence between the pilot sequences and the transmit antenna ports. Because the different transmit antenna ports are differentiated by using the orthogonal pilot sequences, the transmit antenna ports may use completely same pilot mappings, so that time-frequency resources occupied in sending pilot sequences can be reduced. In the method provided in this embodiment, the time-frequency resources occupied by the pilot sequences do not increase as transmit antenna ports of a MIMO system increase. So regardless of how many transmit antenna ports are added, only orthogonal pilot sequences need to be added, and no time-frequency resource needs to be added, thereby improving spectral efficiency and a throughput of the entire system.

In the foregoing first embodiment, before using the $N_t$ orthogonal pilot sequences, the transmitter can generate the $N_t$ orthogonal pilot sequences. In an implementation, the transmitter generates the $N_t$ orthogonal pilot sequences according to the following formula:

$$\text{pilot}(m, n) = e^{\frac{-j2\pi(m-1)(n-1)N_{taps}}{N_{FFT}}},$$

where pilot(m,n) represents the $m^{th}$ pilot element of a pilot sequence corresponding to the $n^{th}$ transmit antenna port, m=1, ..., $N_{FFT}$, n=1, ..., Nt. $N_t$ is the transmit antenna port quantity of the transmitter, $N_{FFT}$ is the quantity of the subcarriers included in the pilot mapping, and $N_{taps}$ is a tap coefficient of the receiver. Before generating the $N_t$ orthogonal pilot sequences according to the foregoing formula, the transmitter can acquire the tap coefficient of the receiver. For the transmitter, in a case in which the pilot mapping is known, the quantity of the subcarriers included in the pilot mapping is also known.

The transmitter may specifically acquire the tap coefficient of the receiver in the following two manners: in one manner, the transmitter preconfigures the tap coefficient of the receiver; and in the other manner, the transmitter sends the receiver a capability negotiation request, where the capability negotiation request message is used to acquire the tap coefficient of the receiver. After receiving the capability negotiation request, the receiver returns, to the transmitter, a capability negotiation response, where the capability negotiation response includes the tap coefficient of the receiver.

It should be clarified that the foregoing example is just one manner for generating a pilot sequence. Certainly, the transmitter may also generate a pilot sequence in another manner. A manner for generating a pilot sequence is not limited in this embodiment.

In some implementations of the present disclosure, the length of the pilot sequence may be greater than or equal to a product of the transmit antenna port quantity $N_t$ and a multipath quantity, which mainly aims to resist a multipath cyclic Doppler frequency shift of a radio channel. The multipath quantity refers to a multipath quantity of a radio channel between the transmitter and the receiver. The multipath quantity of the radio channel is constant within a specific environment and time period, and may be acquired by the transmitter and the receiver.

After generating the pilot sequences corresponding to the transmit antenna ports, the transmitter saves the pilot sequences in the receiver, and when using the pilot sequences, the transmitter inserts, according to the pilot mappings corresponding to the transmit antenna ports, the pilot sequence corresponding to each of the transmit antenna ports into the OFDM symbols that are included in the pilot mapping corresponding to the transmit antenna port.

Figure 1:
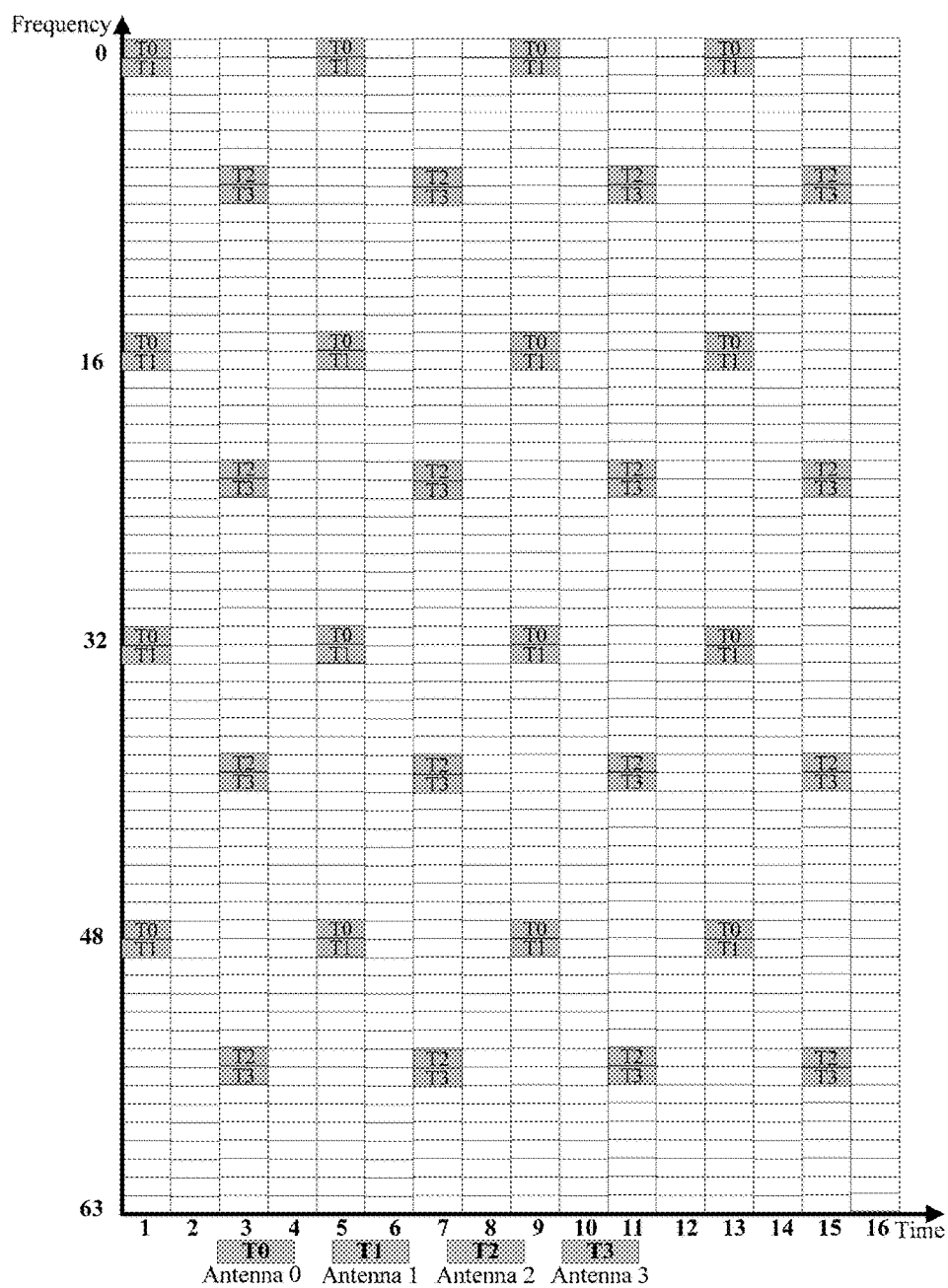
FIG. 1 is a mapping of reference signals when an LTE system uses four transmit antennas.
Figure 4:
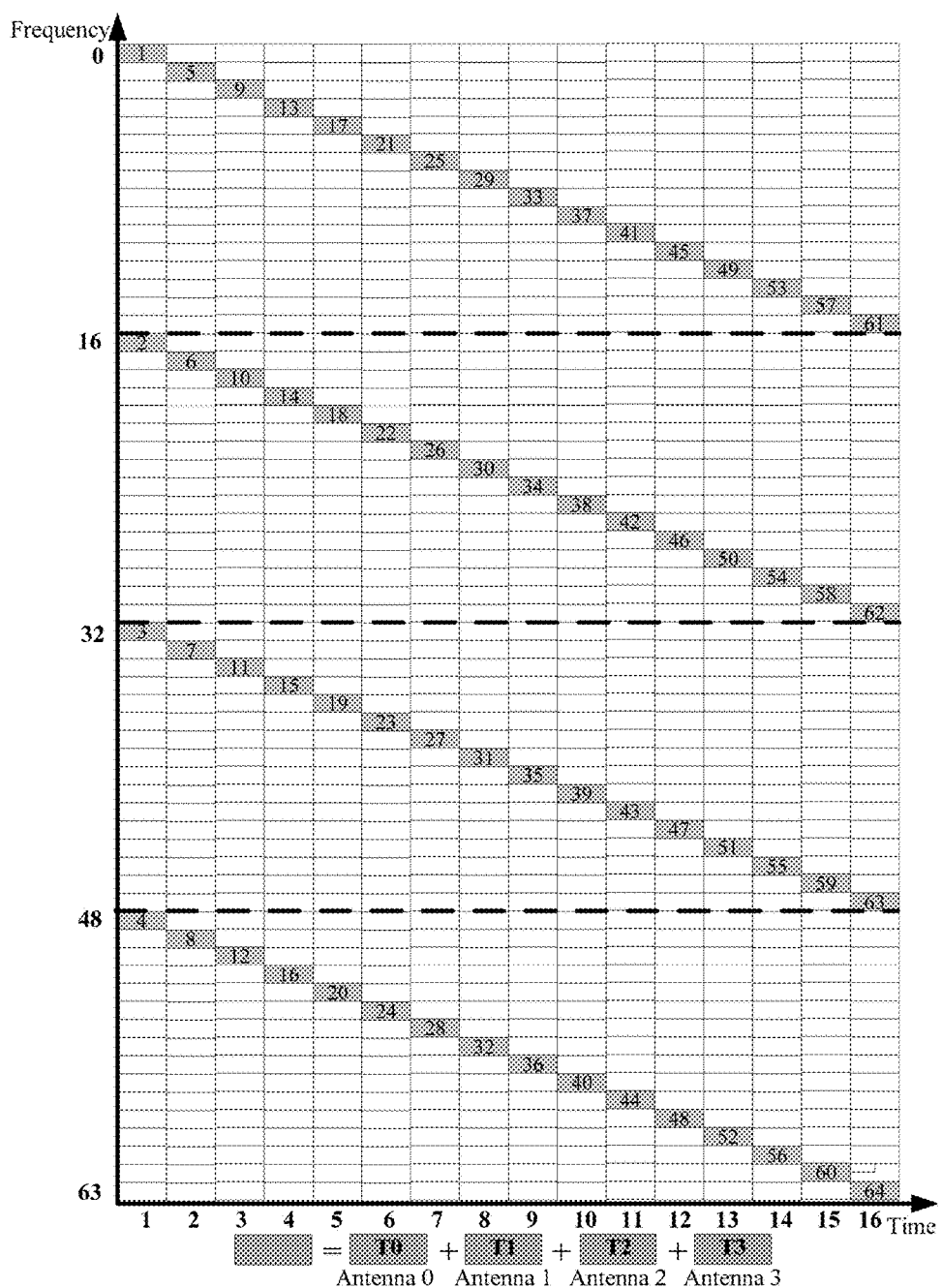
FIG. 4 is a schematic structural diagram of a pilot mapping according to an embodiment of the present disclosure.

In this embodiment, the pilot mappings corresponding to the transmit antenna ports are the same. FIG. 4 is a schematic structural diagram of a pilot mapping according to an embodiment of the present disclosure. A lateral axis in FIG. 4 is a time dimension, and there are 16 OFDM symbols in total; and a longitudinal axis is a frequency dimension, and there are 64 subcarriers in total. Time-frequency points on the pilot mapping are divided into pilot insertion points and non-pilot insertion points according to functions. The pilot insertion point is used for a pilot sequence to be inserted into, and the non-pilot insertion point is used for a wanted signal to be inserted into. Grey areas in the figure are the pilot insertion points, and time-frequency points excluding the pilot insertion points are the non-pilot insertion points, which is different from a pilot mapping shown in FIG. 1. In FIG. 1, time-frequency points at which reference signals of an antenna 0, an antenna 1, an antenna 2, and an antenna 3 are inserted do not overlap with each other, that is, only a reference signal of one antenna can be inserted at each time-frequency point; therefore, the receiver distinguishes the antennas according to positions of the time-frequency points, and reference signals used by the antennas are the same. Assuming that the transmitter has four transmit antennas, in FIG. 4, time-frequency points at which pilot sequences of an antenna 0, an antenna 1, an antenna 2, and an antenna 3 overlap with each other. That is, pilot elements of pilot sequences of the antenna 0, the antenna 1, the antenna 2, and the antenna 3 may be all inserted at each time-frequency point, and the pilot sequences of the antenna 0, the antenna 1, the antenna 2, and the antenna 3 overlap in a time domain and in a frequency domain; therefore, the receiver cannot distinguish the antennas according to the time-frequency points. Because the respective pilot sequences used by the antenna 0, the antenna 1, the antenna 2, and the antenna 3 are orthogonal, the receiver can distinguish the antennas according to the pilot sequences.

FIG. 4 shows only a possible pilot mapping, and the transmitter may use any other pilot mapping. The pilot mapping is not limited in the present disclosure. The pilot mapping may be saved in the transmitter and the receiver in advance. When multiple pilot mappings are saved in the transmitter and the receiver, before the transmitter sends data to the receiver, the transmitter can inform, in advance, the receiver of a pilot mapping to be used by the transmitter; or the transmitter and the receiver may specify, in advance, a pilot mapping to be used. In a specific implementation process, the transmitter and the receiver may add an identifier to each pilot mapping, and different pilot mappings are differentiated by using identifiers. Before sending data, the transmitter sends an identifier of a pilot mapping to be used to the receiver, and the receiver determines, according to the identifier of the pilot mapping, the pilot mapping used by the transmitter.

The transmitter inserts the pilot sequence into the OFDM symbols according to the pilot mapping. When the quantity of the pilot elements that are inserted into each OFDM symbol is equal, the transmitter may insert the pilot sequence into the OFDM symbols in the following manner: inserting, by the transmitter according to the pilot mappings corresponding to the transmit antenna ports, the $n^{th}$ pilot element of the pilot sequence corresponding to each of the transmit antenna ports into the $q^{th}$ subcarrier of the $p^{th}$ OFDM symbol of the pilot mapping, where p and q represent a position at which the $n^{th}$ pilot element of the pilot sequence is located in the pilot mapping, and p and q may be calculated by using the following formulas:

$$P = \left\lfloor \frac{n-1}{N/M} \right\rfloor + 1$$

and q=mod(n−1, N/M)+p, where n=1, ..., N, p=1, ..., M, N is the length of the pilot sequence, M is the quantity of the OFDM symbols included in the pilot mapping q=1, ..., $N_{FFT}$, and $N_{FFT}$ is the quantity of the subcarriers included in the pilot mapping. It can be understood that, when a different pilot mapping is used, a different formula is used when insertion positions of the pilot elements are determined, that is, formulas for calculating p and q are different. The formulas for calculating p and q in this embodiment correspond to the pilot mapping in FIG. 4.

In some implementations, the quantity of the OFDM symbols included in the pilot mapping is $$M \leq \frac{T_c}{T_{OFDM}},$$

where $T_c$ is a coherence time $$T_c = \frac{1}{4D_s}, D_s$$

is a Doppler frequency shift, and $T_{OFDM}$ is OFDM symbol duration. Herein, a value range of M mainly aims to resist a multipath cyclic Doppler frequency shift of a radio channel.

Figure 5:
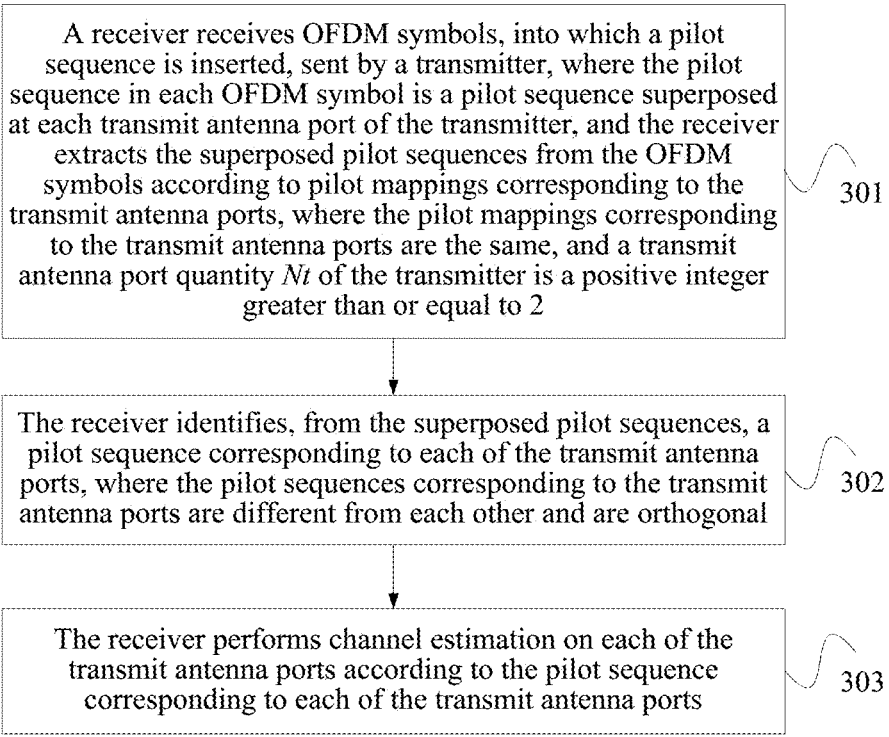
FIG. 5 is a flowchart of a method for extracting a pilot sequence according to an embodiment of the present disclosure.

FIG. 5 is a flowchart of a method for extracting a pilot sequence according to an embodiment of the present disclosure. As shown in FIG. 5, the method provided in this embodiment includes the following steps:

At step 301, a receiver receives OFDM symbols, into which a pilot sequence is inserted, sent by a transmitter, where the pilot sequence in each OFDM symbol is a pilot sequence superposed at each transmit antenna port of the transmitter. The receiver extracts the superposed pilot sequences from the OFDM symbols according to pilot mappings corresponding to the transmit antenna ports, where the pilot mappings corresponding to the transmit antenna ports are the same. The transmit antenna port quantity $N_t$ of the transmitter is a positive integer greater than or equal to 2.

In an implementation manner, the receiver extracts pilot sequences only after receiving M OFDM symbols. In another implementation manner, the receiver may extract pilot elements once each time the receiver receives one OFDM symbol, and then the pilot elements extracted each time form a complete pilot sequence. The pilot sequence extracted by the receiver is the pilot sequence superposed at each transmit antenna port, and the pilot mapping used when the receiver extracts the pilot sequence is the same as a pilot mapping used when the transmitter inserts the pilot sequence. Specifically, the signal received by the receiver includes the superposed pilot sequence and a superposed wanted signal, and the receiver extracts the superposed pilot sequence from a pilot insertion position of the pilot mapping according to the pilot mapping. In this embodiment, because the pilot mappings used at the transmit antenna ports are the same, the receiver can extract the pilot sequences only once, and the extracted pilot sequences are the pilot sequences superposed at the transmit antenna ports. The present solution thus avoids having each transmit antenna port use a different pilot mapping such that the receiver needs to extract a pilot sequence once for each transmit antenna port, where the pilot sequence extracted at each transmit antenna port is independent and the pilot sequences of the transmit antenna ports are not superposed together.

At step 302, the receiver identifies, from the superposed pilot sequences, a pilot sequence corresponding to each of the transmit antenna ports, where the pilot sequences corresponding to the transmit antenna ports are different from each other and are orthogonal.

The receiver can perform channel estimation on each of the transmit antenna ports. For example, first, the receiver identifies, from the superposed pilot sequences, the pilot sequence corresponding to each of the transmit antenna ports, and then performs channel estimation on each of the transmit antenna ports according to the pilot sequence corresponding to each of the transmit antenna ports, where the pilot sequences corresponding to the transmit antenna ports are different from each other and are orthogonal.

The receiver may identify, in the following manner from the superposed pilot sequences, the pilot sequence corresponding to each of the transmit antenna ports. First, the receiver calculates according to a tap coefficient, a quantity of subcarriers included in the pilot mapping, and the transmit antenna port quantity of the transmitter, a pseudo inverse matrix corresponding to each of the transmit antenna ports, where each transmit antenna port corresponds to one pseudo inverse matrix, and the pseudo inverse matrix corresponding to each of the transmit antenna ports is orthogonal. Then, the receiver identifies, from the superposed pilot sequences according to the pseudo inverse matrix corresponding to each of the transmit antenna ports, the pilot sequence corresponding to each of the transmit antenna ports. Specifically, the receiver multiplies the pseudo inverse matrix corresponding to each transmit antenna port by the superposed pilot sequence, to obtain the pilot sequence corresponding to each transmit antenna port. The foregoing manner uses orthogonality of the pseudo inverse matrix, so that a pilot sequence obtained by performing matrix multiplication each time particularly corresponds to a transmit antenna port, and the superposed pilot sequence of another transmit antenna port is suppressed.

In this embodiment, the calculating, by the receiver according to a tap coefficient, a quantity of subcarriers included in the pilot mapping, and the transmit antenna port quantity $N_t$ of the transmitter, a pseudo inverse matrix corresponding to each of the transmit antenna ports can include the following steps:

In a first step, the receiver calculates a matrix A according to the following formulas:

$$A = [a_{m,n}] \text{ and } a_{m,n} = e^{\frac{-j2\pi mn}{N_{FFT}}},$$

where m=1, ..., $N_{FFT}$, n=1, ..., $N_{taps}$, $N_{taps}$ is the tap coefficient of the receiver, and $N_{FFT}$ is the quantity of the subcarriers included in the pilot mapping.

Before calculating, according to the tap coefficient, the quantity of the subcarriers included in the pilot mapping, and the transmit antenna port quantity $N_t$ of the transmitter, the pseudo inverse matrix corresponding to each of the transmit antenna ports, the receiver can acquire the transmit antenna port quantity $N_t$, the quantity of the subcarriers included in the pilot mapping, and the tap coefficient of the receiver. Specifically, if the transmit antenna port quantity $N_t$ is a variable, the transmit antenna port quantity $N_t$ may be sent by the transmitter to the receiver; or if the transmit antenna port quantity $N_t$ is a constant, the transmit antenna port quantity $N_t$ may be preconfigured, where the quantity of the subcarriers included in the pilot mapping and the tap coefficient of the receiver are known to the receiver.

In a second step, the receiver separately acquires the $K^{th}$ column of the matrixes A to generate $N_t$ diagonal matrixes, and separately multiplies the diagonal matrixes by the matrix A to obtain $N_t$ matrixes $B_k$, where k=1, ..., Nt, a diagonal element of the diagonal matrix is the $K^{th}$ column of the matrix A, and other elements of the diagonal matrix are all zero.

In a third step, the receiver separately generates a generator matrix $C_k$ according to the matrix $B_k$, where $C_k = \{B_1, ..., B_k\}$.

For example, when there are four transmit antenna ports, values of k is 1, 2, 3, and 4, that is, four matrixes $B_1$, $B_2$, $B_3$, and $B_4$ are generated at the second step. Assuming that each of the matrixes $B_1$, $B_2$, $B_3$, and $B_4$ is a 4×4 matrix, when the value of k is 1, a matrix $C_1$ equal to $B_1$; when the value of k is 2, a matrix $C_2$ is a 4×8 matrix, the matrix $C_2$ includes $B_1$ and $B_2$, and so on; a matrix C3 is a 4×12 matrix, and the matrix C3 includes $B_1$, $B_2$ and $B_3$; and a matrix C4 is a 4×16 matrix, and the matrix C4 includes $B_1$, $B_2$, $B_3$ and $B_4$.

In a fourth step, the receiver calculates, according to the following formula, a pseudo inverse matrix $D_k$ corresponding to each of the transmit antenna ports: $D_k = (C'_k * C_k)^{-1} * C'_k$, where $C'_k$ is a conjugate transpose matrix of the matrix $C_k$, and $(X)^{-1}$ represents inversion on a matrix x.

At step 303, the receiver performs channel estimation on each of the transmit antenna ports according to the pilot sequence corresponding to each of the transmit antenna ports.

The performing, by the receiver, channel estimation on each of the transmit antenna ports according to the pilot sequence corresponding to each of the transmit antenna ports can include, for example, determining, by the receiver, a frequency domain transfer function of each of the transmit antenna ports according to the pilot sequence corresponding to each of the transmit antenna ports; or determining a channel status parameter of each transmit antenna port, where the channel status parameter is, for example, a channel matrix H, or a multipath delay.

In the method provided in this embodiment, the receiver receives OFDM symbols, into which a pilot sequence is inserted, sent by the transmitter, where the pilot sequence in each OFDM symbol is a pilot sequence superposed at each transmit antenna port, and the receiver extracts the superposed pilot sequences from the OFDM symbols according to pilot mappings corresponding to the transmit antenna ports, and performs channel estimation according to the superposed pilot sequences. Because the pilot mappings corresponding to the transmit antenna ports of the transmitter are the same, that is, the transmit antenna ports need to use only one pilot mapping. Time-frequency resources occupied in sending pilot sequences can be reduced.

In the embodiments of the present disclosure, the length of the pilot sequence may be a static constant or may be a variable. When the pilot sequence is a variable, the pilot sequence is mainly determined by the transmit antenna port quantity of the transmitter and the multipath quantity of the radio channel. In an actual communications system, a different transmitter may have a different transmit antenna port quantity, and a multipath quantity of a radio channel in a different environment may also be different; therefore, the length of the pilot sequence may change dynamically. In addition, a quantity M of OFDM symbols included in one pilot mapping may also be a constant or a variable. When M is a variable, M can be determined by a coherence time $T_c$ and OFDM symbol duration, but the OFDM symbol duration is related to a channel bandwidth and a quantity of points in Fourier transformation. When the channel bandwidth of the communications system changes, if the quantity of points in Fourier transformation does not change, the OFDM symbol duration changes. In addition, even if the channel bandwidth does not change, a Doppler frequency shift may also differ. Therefore, the quantity M of the OFDM symbols included in the pilot mapping may change dynamically.

Figure 6:
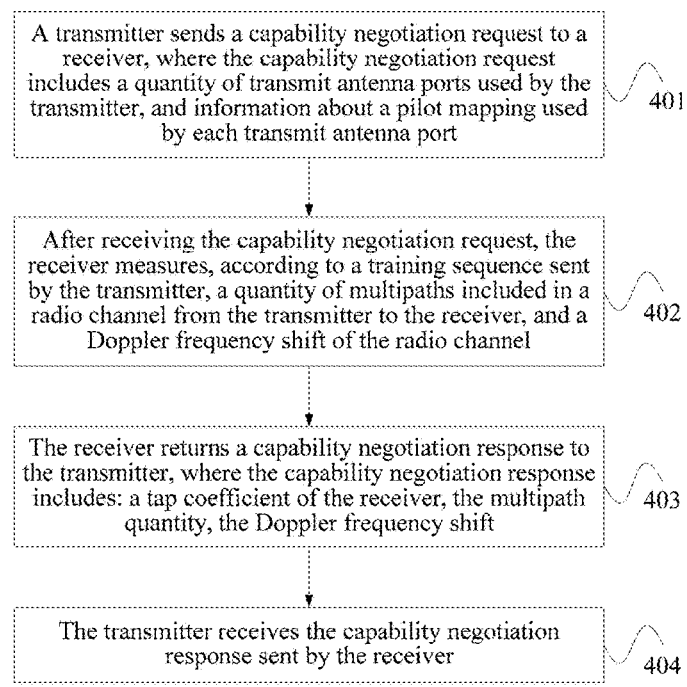
FIG. 6 is a flowchart of another method for inserting a pilot sequence according to an embodiment of the present disclosure.

When the foregoing parameter changes dynamically, the pilot mapping and other probably used parameters may change. Therefore, the transmitter and the receiver can negotiate the foregoing parameter, and then perform the methods in the second embodiment and in the third embodiment. The third embodiment of the present disclosure mainly describes an example processing procedure when a parameter changes dynamically. FIG. 6 is a flowchart of another method for inserting a pilot sequence according to an embodiment of the present disclosure. As shown in FIG. 6, the method provided in this embodiment includes the following steps:

At step 401, a transmitter sends a capability negotiation request to a receiver, where the capability negotiation request includes a quantity of transmit antenna ports used by the transmitter, and information about a pilot mapping used by each transmit antenna port.

The information about the pilot mapping may be an identifier of the pilot mapping used by the transmitter. The receiver determines, according to an identifier of a pilot mapping, which pilot mapping is used by the transmitter, so that the receiver subsequently extracts a pilot sequence according to the pilot mapping. The transmitter sends the quantity of the transmit antenna ports to the receiver, so that the receiver can perform channel estimation according to the quantity of the transmit antenna ports and some other parameters. For a specific process, reference may be made to the description in the second embodiment, and details are not described herein again.

At step 402, after receiving the capability negotiation request, the receiver measures, according to a training sequence sent by the transmitter, a quantity of multipaths included in a radio channel from the transmitter to the receiver, and a Doppler frequency shift of the radio channel.

The training sequence is sent by the transmitter, and the training sequence is mainly used for the receiver to measure the multipath quantity and the Doppler frequency shift. Measurement of the multipath quantity and the Doppler frequency shift by the receiver according to the training sequence can be performed by any suitable method.

At step 403, the receiver returns a capability negotiation response to the transmitter, where the capability negotiation response includes: a tap coefficient of the receiver, the multipath quantity, the Doppler frequency shift.

The capability negotiation response may further include: a channel bandwidth and a quantity of points in Fourier transformation, so that the transmitter determines OFDM symbol duration according to the channel bandwidth and the quantity of points in Fourier transformation, where the quantity of points in Fourier transformation is the same as a quantity of subcarriers included in the pilot mapping. The OFDM symbol duration may be further set according to an empirical value. In this case, the transmitter does not need to acquire the channel bandwidth or the quantity of points in Fourier transformation.

At step 404, the transmitter receives the capability negotiation response sent by the receiver.

After capability negotiation between the transmitter and the receiver is completed, related configuration is performed according to parameters included in the capability negotiation response. For example, a length of a pilot sequence is configured according to the multipath quantity and the transmit antenna port quantity, and the OFDM symbol duration is configured according to the channel bandwidth, the quantity of points in Fourier transformation, and the Doppler frequency shift. After the configuration is completed, the transmitter and the receiver may perform the methods in the first embodiment and in the second embodiment.

In the methods of the embodiments of the present disclosure, different transmit antenna ports of a transmitter are mainly differentiated by using a group of orthogonal pilot sequences, that is, time frequency orthogonality is replaced with code division orthogonality. By means of a method of the code division orthogonality, transmit antenna ports may use completely same pilot mappings, that is, pilot sequences of the transmit antenna ports may completely overlap in a frequency domain and a time domain. Therefore, time-frequency resources occupied in sending pilot sequences can be reduced. In the methods provided in the embodiments of the present disclosure, the time-frequency resources occupied by the pilot sequences may not increase as transmit antennas of a MIMO system increase. For example, regardless of how many transmit antennas are added, only orthogonal pilot sequences need to be added, and no time-frequency resource needs to be added correspondingly, thereby improving spectral efficiency and a throughput of the entire system.

Figure 7:
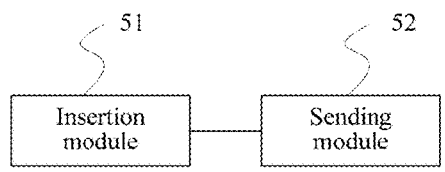
FIG. 7 is a schematic structural diagram of a transmitter according to an embodiment of the present disclosure.

FIG. 7 is a schematic structural diagram of a transmitter according to an embodiment of the present disclosure. As shown in FIG. 7, the transmitter provided in this embodiment includes: an insertion module 51 and a sending module 52.

The insertion module 51 is configured to insert, according to pilot mappings corresponding to $N_t$ transmit antenna ports by using $N_t$ orthogonal pilot sequences that are different from each other, a pilot sequence corresponding to each of the transmit antenna ports into orthogonal frequency division multiplexing (OFDM) symbols that are included in the pilot mapping corresponding to the transmit antenna port. There is a one-to-one correspondence between the $N_t$ pilot sequences and the $N_t$ transmit antenna ports of the transmitter, where $N_t$ is a positive integer greater than or equal to 2. The pilot mappings corresponding to the transmit antenna ports are the same among the $N_t$ transmit antenna ports of the transmitter.

The sending module 52 is configured to send the OFDM symbols into which the insertion module 51 inserts the pilot sequence to a receiver.

In some implementations, a length of each of the pilot sequences is greater than or equal to a product of the transmit antenna port quantity $N_t$ and a multipath quantity, and the multipath quantity is a multipath quantity of a radio channel between the transmitter and the receiver.

Optionally, a quantity of the OFDM symbols included in the pilot mapping is $$M \leq \frac{T_c}{T_{OFDM}},$$

where $T_c$ is a coherence time, $$T_c = \frac{1}{4D_s}, D_s$$

is a Doppler frequency shift, and $T_{OFDM}$ is OFDM symbol duration.

In some implementations, a quantity of pilot elements of the pilot sequence that are inserted into each OFDM symbol is equal, and the quantity of the pilot elements is a ratio of a length of the pilot sequence to a quantity of the OFDM symbols included in the pilot mapping.

In some implementations, a quantity of pilot elements of the pilot sequence that are inserted into each OFDM symbol is unequal.

When the quantity of the pilot elements that are inserted into each OFDM symbol is equal, the insertion module 51 can be configured to: insert, according to the pilot mappings corresponding to the transmit antenna ports, the $n^{th}$ pilot element of the pilot sequence corresponding to each of the transmit antenna ports into the $q^{th}$ subcarrier of the $p^{th}$ OFDM symbol of the pilot mapping corresponding to the transmit antenna port, where $$P = \left\lfloor \frac{n-1}{N/M} \right\rfloor + 1,$$

q=mod(n−1, N/M)+p, n=1, ..., N, p=1, ..., M, and q=1, ..., $N_{FFT}$, where N is the length of the pilot sequence, M is the quantity of the OFDM symbols included in the pilot mapping, and $N_{FFT}$ is a quantity of subcarriers included in the pilot mapping.

Further, the transmitter in this embodiment may further include: a generation module, configured to generate, according to the following formula, the $N_t$ orthogonal pilot sequences that are different from each other:

$$\text{pilot}(m, n) = e^{\frac{-j2\pi(m-1)(n-1)N_{taps}}{N_{FFT}}},$$

where pilot(m,n) represents the $m^{th}$ pilot element of a pilot sequence corresponding to the $n^{th}$ transmit antenna port, m=1, ..., $N_{FFT}$, n=1, ..., Nt, $N_t$ is the transmit antenna port quantity of the transmitter, $N_{FFT}$ is the quantity of the subcarriers included in the pilot mapping, and $N_{taps}$ is a tap coefficient of the receiver.

Before generating the $N_t$ orthogonal pilot sequences that are different from each other, the generation module can be further configured to: acquire the tap coefficient of the receiver. The generation module ca be further configured to: acquire the multipath quantity, the Doppler frequency shift, and the OFDM symbol duration.

The transmitter provided in this embodiment may configured to perform the technical solutions of the embodiments shown in FIG. 2 and FIG. 3, and their specific implementation manners and technical effects are similar, which are not described in detail herein again.

Figure 8:
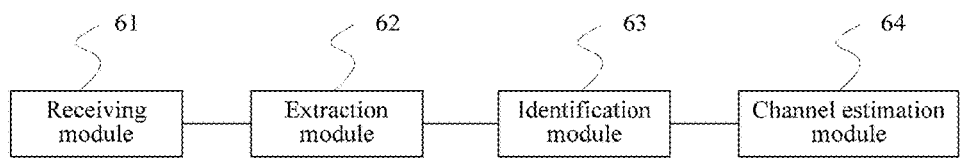
FIG. 8 is a schematic structural diagram of a receiver according to an embodiment of the present disclosure.

FIG. 8 is a schematic structural diagram of a receiver according to an embodiment of the present disclosure. As shown in FIG. 8, the receiver provided in this embodiment includes: a receiving module 61, an extraction module 62, an identification module 63, and a channel estimation module 64.

The receiving module 61 is configured to receive orthogonal frequency division multiplexing OFDM symbols, into which a pilot sequence is inserted, sent by a transmitter.

The extraction module 62 is configured to extract, from the OFDM symbols received by the receiving module 61, according to pilot mappings corresponding to transmit antenna ports of the transmitter, pilot sequences superposed at the transmit antenna ports. The pilot mappings corresponding to the transmit antenna ports are the same, and a transmit antenna port quantity $N_t$ of the transmitter is a positive integer greater than or equal to 2.

The identification module 63 is configured to identify, from the superposed pilot sequences extracted by the extraction module 62, a pilot sequence corresponding to each of the transmit antenna ports, where the pilot sequences corresponding to the transmit antenna ports are different from each other and are orthogonal.

The channel estimation module 64 is configured to perform channel estimation on each of the transmit antenna ports according to the pilot sequence that is corresponding to each of the transmit antenna ports and that is identified by the identification module 63.

In some implementations, the identification module 63 can be configured to: first, calculate, according to a tap coefficient, a quantity of subcarriers included in the pilot mapping, and the transmit antenna port quantity $N_t$, a pseudo inverse matrix corresponding to each of the transmit antenna ports, where the pseudo inverse matrix corresponding to each of the transmit antenna ports is orthogonal; and then identify, from the superposed pilot sequences according to the pseudo inverse matrix corresponding to each of the transmit antenna ports, the pilot sequence corresponding to each of the transmit antenna ports.

The channel estimation module 64 can be configured to: determine a frequency domain transfer function of each of the transmit antenna ports according to the pilot sequence corresponding to each of the transmit antenna ports.

In some implementations, the identification module 63 is specifically configured to: calculate a matrix A according to the following formulas:

$$A[a_{m,n}] \text{ and } a_{m,n} = e^{\frac{-j2\pi mn}{N_{FFT}}},$$

where m=1, ..., $N_{FFT}$, n=1, ..., $N_{taps}$, $N_{FFT}$ is the quantity of the subcarriers included in the pilot mapping, and $N_{taps}$ is the tap coefficient of the receiver; then separately acquire the $K^{th}$ column of the matrixes A to generate $N_t$ diagonal matrixes, and separately multiply the diagonal matrixes by the matrix A to obtain $N_t$ matrixes $B_k$, where k=1, ..., Nt; then separately generate a generator matrix $C_k$ according to the matrix $B_k$, where $C_k = \{B_1, ..., B_k\}$; and finally, calculate, according to the following formula, a pseudo inverse matrix $D_k$ corresponding to each of the transmit antenna ports: $D_k=(C'_k*C_k)^{-1}*C'_k$, where $C'_k$ is a conjugate transpose matrix of the matrix $C_k$, and $(X)^{-1}$ represents inversion on a matrix x.

Further, the receiver in this embodiment may further include: an acquiring module, configured to acquire the quantity of the subcarriers included in the pilot mapping and the transmit antenna port quantity $N_t$.

The receiver provided in this embodiment may be configured to perform the technical solutions of the embodiments in FIG. 2 and FIG. 5, and their specific implementation manners and technical effects are similar, which are not described in detail herein again.

Figure 9:
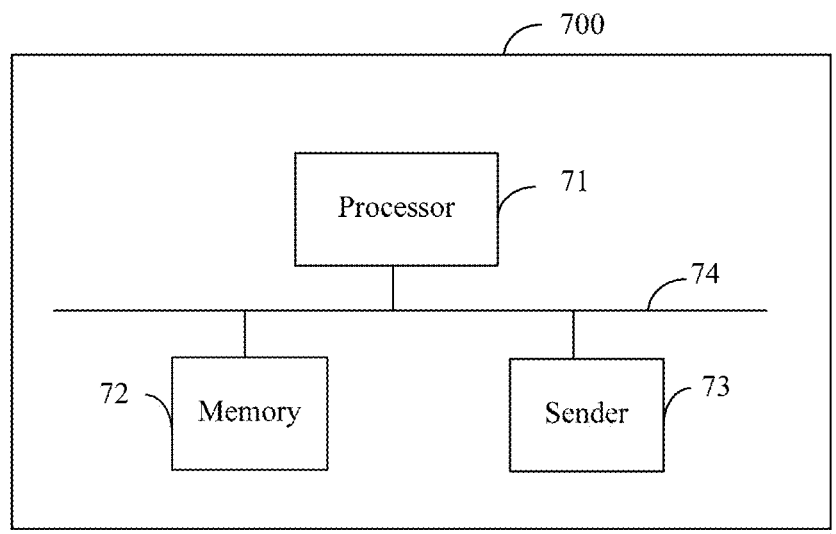
FIG. 9 is a schematic structural diagram of another transmitter according to an embodiment of the present disclosure.

FIG. 9 is a schematic structural diagram of another transmitter according to an embodiment of the present disclosure. As shown in FIG. 9, the transmitter 700 includes: a processor 71, a memory 72, a sender 73, and a bus 74, where the memory 72 and the sender 73 are connected to the processor 71 by using the bus 74, the memory 72 is configured to store an instruction, and the processor 71 is configured to execute the instruction stored in the memory 72. For example, the instruction instructs the processor 71 to insert, according to pilot mappings corresponding to $N_t$ transmit antenna ports by using $N_t$ orthogonal pilot sequences that are different from each other, a pilot sequence corresponding to each of the transmit antenna ports into orthogonal frequency division multiplexing OFDM symbols that are included in the pilot mapping corresponding to the transmit antenna port. There is a one-to-one correspondence between the $N_t$ pilot sequences and the $N_t$ transmit antenna ports of the transmitter, where $N_t$ is a positive integer greater than or equal to 2, and the pilot mappings corresponding to the transmit antenna ports are the same. The instruction further instructs the sender 73 to send the OFDM symbols into which the pilot sequence is inserted to a receiver.

In some implementations, a length of each of the pilot sequences is greater than or equal to a product of the transmit antenna port quantity $N_1$ and a multipath quantity, and the multipath quantity is a multipath quantity of a radio channel between the transmitter and the receiver.

In some implementations, a quantity of the OFDM symbols included in the pilot mapping is $$M \le \frac{T_c}{T_{OFDM}},$$

where $T_c$ is a coherence time, $$T_c = \frac{1}{4D_s}, D_s$$

is a Doppler frequency shift, and $T_{OFDM}$ is OFDM symbol duration.

In some implementations, a quantity of pilot elements of the pilot sequence that are inserted into each OFDM symbol is equal, and the quantity of the pilot elements is a ratio of a length of the pilot sequence to a quantity of the OFDM symbols included in the pilot mapping.

In some implementations, a quantity of pilot elements of the pilot sequence that are inserted into each OFDM symbol is unequal.

When the quantity of the pilot elements that are inserted into each OFDM symbol is equal, the processor 71 can be configured to: insert, according to the pilot mappings corresponding to the transmit antenna ports, the $n^{th}$ pilot element of the pilot sequence corresponding to each of the transmit antenna ports into the $q^{th}$ subcarrier of the $p^{th}$ OFDM symbol of the pilot mapping corresponding to the transmit antenna port, where $$P = \left\lfloor \frac{n-1}{N/M} \right\rfloor + 1,$$

$q=\text{mod}(n-1, N/M)+p$, $n=1, \ldots, N$, $p=1, \ldots, M$, and $q=1, \ldots, N_{FFT}$, where N is the length of the pilot sequence, M is the quantity of the OFDM symbols included in the pilot mapping, and $N_{FFT}$ is a quantity of subcarriers included in the pilot mapping.

In this embodiment, the processor 71 is further configured to: before using the $N_t$ orthogonal pilot sequences that are different from each other, generate, according to the following formula, the $N_1$ orthogonal pilot sequences that are different from each other:

$$\text{pilot}(m, n) = e^{\frac{-j2\pi(m-1)(n-1)N_{taps}}{N_{FFT}}},$$

where pilot(m,n) represents the $m^{th}$ pilot element of a pilot sequence corresponding to the $n^{th}$ transmit antenna port, $m=1, \ldots, N_{FFT}$, $n=1, \ldots, Nt$, $N_t$ is the transmit antenna port quantity of the transmitter, $N_{FFT}$ is the quantity of the subcarriers included in the pilot mapping, and $N_{taps}$ is a tap coefficient of the receiver.

The processor 71 is further configured to, before generating the $N_t$ orthogonal pilot sequences that are different from each other, acquire the tap coefficient of the receiver, and acquire the multipath quantity, the Doppler frequency shift, and the OFDM symbol duration.

The transmitter provided in this embodiment may be configured to perform the technical solutions of the method embodiments shown in FIG. 2 and FIG. 3, and their specific implementation manners and technical effects are similar, which are not described in detail herein again.

Figure 10:
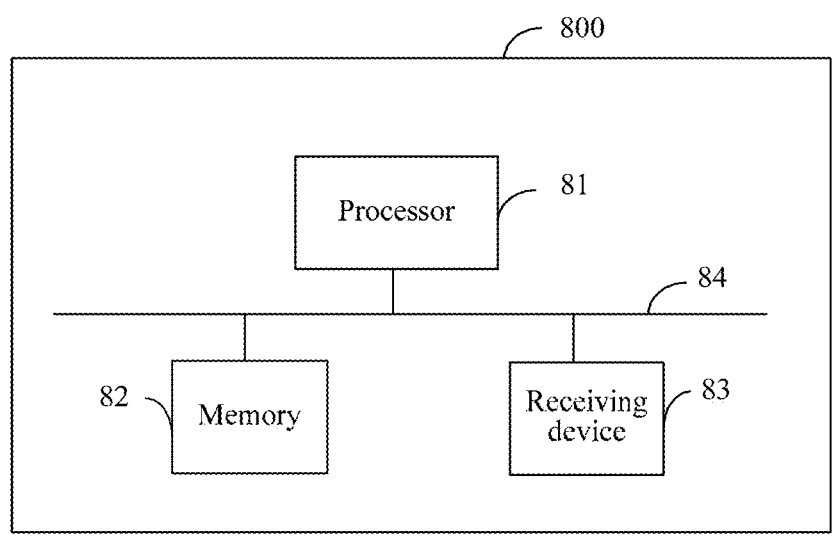
FIG. 10 is a schematic structural diagram of another receiver according to an embodiment of the present disclosure.

FIG. 10 is a schematic structural diagram of another receiver according to an embodiment of the present disclosure. As shown in FIG. 10, the receiver 800 in this embodiment includes: a processor 81, a memory 82, a receiving device 83, and a bus 84, where the memory 82 and the receiving device 83 are connected to the processor 81 by using the bus 84, the memory 82 is configured to store an instruction, and the processor 81 is configured to execute the instruction stored in the memory 82. The instruction can instruct the receiving device 83 to receive orthogonal frequency division multiplexing OFDM symbols, into which a pilot sequence is inserted, sent by a transmitter. The instruction can instruct the processor 81 to extract, from the OFDM symbols according to pilot mappings corresponding to transmit antenna ports of the transmitter, pilot sequences superposed at the transmit antenna ports, where the pilot mappings corresponding to the transmit antenna ports are the same, and a transmit antenna port quantity $N_t$ of the transmitter is a positive integer greater than or equal to 2. The instruction can further instruct the processor 81 to identify, from the superposed pilot sequences, a pilot sequence corresponding to each of the transmit antenna ports, where pilot sequences corresponding to the transmit antenna ports are different from each other and are orthogonal. The instruction can further instruct the processor 81 perform channel estimation on each of the transmit antenna ports according to the pilot sequence corresponding to each of the transmit antenna ports.

When identifying, from the superposed pilot sequences, the pilot sequence corresponding to each of the transmit antenna ports, the processor 81 can be specifically configured to calculate, according to a tap coefficient, a quantity of subcarriers included in the pilot mapping, and the transmit antenna port quantity $N_t$, a pseudo inverse matrix corresponding to each of the transmit antenna ports, where the pseudo inverse matrix corresponding to each of the transmit antenna ports is orthogonal; and then identify, from the superposed pilot sequences according to the pseudo inverse matrix corresponding to each of the transmit antenna ports, the pilot sequence corresponding to each of the transmit antenna ports.

When performing channel estimation on each of the transmit antenna ports according to the pilot sequence corresponding to each of the transmit antenna ports, the processor 81 can be specifically configured to determine a frequency domain transfer function of each of the transmit antenna ports according to the pilot sequence corresponding to each of the transmit antenna ports.

When calculating, according to the tap coefficient, the quantity of subcarriers included in the pilot mapping, and the transmit antenna port quantity $N_t$, the pseudo inverse matrix corresponding to each of the transmit antenna ports, the processor 81 is specifically configured to: first, calculate a matrix A according to the following formulas:

$$A[a_{m,n}] \text{ and } a_{m,n} = e^{-\frac{j2\pi mn}{N_{FFT}}},$$

where m=1, ..., $N_{FFT}$, n=1, ..., $N_{taps}$, $N_{FFT}$ is the quantity of the subcarriers included in the pilot mapping, and $N_{taps}$ is the tap coefficient of the receiver; then separately acquire the $K^{th}$ column of the matrixes A to generate $N_t$ diagonal matrices, and separately multiply the diagonal matrices by the matrix A to obtain $N_t$ matrixes $B_k$, where k=1, ..., Nt; then separately generate a generator matrix $C_k$ according to the matrix $B_k$, where $C_k = \{B_1, ..., B_k\}$; and finally, calculate, according to the following formula, a pseudo inverse matrix $D_k$ corresponding to each of the transmit antenna ports: $D_k = (C'_k {}^* C_k)^{-1} {}^* C'_k$, where $C'_k$ is a conjugate transpose matrix of the matrix $C_k$, and $(X)^{-1}$ represents inversion on a matrix x.

In this embodiment, before calculating, according to the tap coefficient, the quantity of subcarriers included in the pilot mapping, and the transmit antenna port quantity $N_t$, the pseudo inverse matrix corresponding to each of the transmit antenna ports, the processor 81 is further configured to: acquire the quantity of the subcarriers included in the pilot mapping and the transmit antenna port quantity $N_t$.

The receiver provided in this embodiment may be configured to perform the technical solutions of the method embodiments shown in FIG. 2 and FIG. 5, and their specific implementation manners and technical effects are similar, which are not described in detail herein again.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for inserting a pilot sequence, comprising:
    inserting, by a transmitter according to pilot mappings corresponding to $N_t$ transmit antenna ports by using $N_t$ orthogonal pilot sequences that are different from each other, a pilot sequence corresponding to each of the transmit antenna ports into orthogonal frequency division multiplexing (OFDM) symbols that are comprised in the pilot mapping corresponding to the transmit antenna port, wherein the pilot mapping indicates a location for inserting the pilot sequence in a plurality of time-frequency resources, wherein there is a one-to-one correspondence between the $N_t$ pilot sequences and the $N_t$ transmit antenna ports of the transmitter, wherein $N_t$ is a positive integer greater than or equal to 2, the pilot mappings corresponding to the transmit antenna ports are the same for the $N_t$ transmit antenna ports, and a length of each of the pilot sequences is greater than or equal to a product of a transmit antenna port quantity $N_t$ and a multipath quantity, and the multipath quantity is a multipath quantity of a radio channel between the transmitter and the receiver; and
    sending, by the transmitter to a receiver, the OFDM symbols into which the pilot sequence is inserted.

2. The method according to claim 1, wherein a quantity of the OFDM symbols comprised in the pilot mapping is $$M \leq \frac{T_c}{T_{OFDM}},$$

wherein $T_c$ is a coherence time, $$T_c = \frac{1}{4D_s}, D_s$$

is a Doppler frequency shift, and $T_{OFDM}$ is OFDM symbol duration.

3. The method according to claim 1, wherein a quantity of pilot elements of the pilot sequence that are inserted into each OFDM symbol is equal, and the quantity of the pilot elements is a ratio of a length of the pilot sequence to a quantity of the OFDM symbols comprised in the pilot mapping.

4. The method according to claim 1, wherein a quantity of pilot elements of the pilot sequence that are inserted into each OFDM symbol is unequal.

5. The method according to claim 3, wherein when the quantity of the pilot elements that are inserted into each OFDM symbol is equal, the inserting, by a transmitter according to pilot mappings corresponding to transmit antenna ports, a pilot sequence corresponding to each of the transmit antenna ports into orthogonal frequency division multiplexing OFDM symbols that are comprised in the pilot mapping corresponding to the transmit antenna port comprises:

inserting, by the transmitter according to the pilot mappings corresponding to the transmit antenna ports, the $n^{th}$ pilot element of the pilot sequence corresponding to each of the transmit antenna ports into the $q^{th}$ subcarrier of the $p^{th}$ OFDM symbol of the pilot mapping corresponding to the transmit antenna port, wherein $$P = \left\lfloor \frac{n-1}{N/M} \right\rfloor + 1,$$

q=mod(n−1, N/M)+p, n=1, ..., N, p=1, ..., M, and q=1, ..., $N_{FFT}$, wherein N is the length of the pilot sequence, M is the quantity of the OFDM symbols comprised in the pilot mapping, and $N_{FFT}$ is a quantity of subcarriers comprised in the pilot mapping.

6. A method for extracting a pilot sequence, comprising:
receiving, by a receiver, orthogonal frequency division multiplexing (OFDM) symbols, wherein a pilot sequence is inserted into the OFDM symbols, and the OFDM symbols are sent by a transmitter;
extracting, by the receiver from the OFDM symbols according to pilot mappings corresponding to transmit antenna ports of the transmitter, pilot sequences superposed at the transmit antenna ports, wherein the pilot mappings indicate locations for inserting the pilot sequences in a plurality of time-frequency resources, the pilot mappings corresponding to the transmit antenna ports are the same for the transmit antenna ports, and a transmit antenna port quantity $N_t$ of the transmitter is a positive integer greater than or equal to 2;
identifying, by the receiver from the superposed pilot sequences, a pilot sequence corresponding to each of the transmit antenna ports, wherein the pilot sequences corresponding to the transmit antenna ports are different from each other and are orthogonal, wherein the identifying the pilot sequence corresponding to each of the transmit antenna ports comprises:
calculating, by the receiver according to a tap coefficient, a quantity of subcarriers comprised in the pilot mapping, and the transmit antenna port quantity $N_t$, a pseudo inverse matrix corresponding to each of the transmit antenna ports, wherein the pseudo inverse matrix corresponding to each of the transmit antenna ports is orthogonal; and
identifying, by the receiver from the superposed pilot sequences according to the pseudo inverse matrix corresponding to each of the transmit antenna ports, the pilot sequence corresponding to each of the transmit antenna ports; and
performing, by the receiver, channel estimation on each of the transmit antenna ports according to the pilot sequence corresponding to each of the transmit antenna ports, and wherein the performing the channel estimation on each of the transmit antenna ports comprises:
determining, by the receiver, a frequency domain transfer function of each of the transmit antenna ports according to the pilot sequence corresponding to each of the transmit antenna ports.
7. The method according to claim 6, wherein the calculating, by the receiver according to a tap coefficient, a quantity of subcarriers comprised in the pilot mapping, and the transmit antenna port quantity $N_t$, a pseudo inverse matrix corresponding to each of the transmit antenna ports comprises:
calculating, by the receiver, a matrix A according to the following formulas:

$$A[a_{m,n}] \text{ and } a_{m,n} = e^{\frac{-j2\pi mn}{N_{FFT}}},$$

wherein m=1, L, $N_{FFT}$, n=1, L, $N_{taps}$, $N_{FFT}$ is the quantity of the subcarriers comprised in the pilot mapping, and $N_{taps}$ is the tap coefficient of the receiver;
separately acquiring, by the receiver, the $K^{th}$ column of the matrixes A to generate $N_t$ diagonal matrixes, and separately multiplying the diagonal matrixes by the matrix A to obtain $N_t$ matrixes $B_k$, wherein k=1, L, Nt;
separately generating, by the receiver, a generator matrix $C_k$ according to the matrix $B_k$, wherein $C_k = \{B_1, \ldots, B_k\}$; and
calculating, by the receiver according to the following formula, a pseudo inverse matrix $D_k$ corresponding to each of the transmit antenna ports: $D_k = (C'_k {}^* C_k)^{-1} {}^* C'_k$, wherein $C'_k$ is a conjugate transpose matrix of the matrix $C_k$, and $(X)^{-1}$ represents inversion on a matrix x.
8. The method according to claim 6, before the calculating, by the receiver according to a tap coefficient, a quantity of subcarriers comprised in the pilot mapping, and the transmit antenna port quantity $N_t$, a pseudo inverse matrix corresponding to each of the transmit antenna ports, further comprising:
acquiring, by the receiver, the quantity of the subcarriers comprised in the pilot mapping and the transmit antenna port quantity $N_t$.
9. A transmitter, comprising: at least one processor, a memory, and a sender, wherein the memory is configured to store programming instructions for execution by the at least one processor and the sender, wherein
the programming instructions instruct the at least one processor to insert, according to pilot mappings corresponding to $N_t$ transmit antenna ports by using $N_t$ orthogonal pilot sequences that are different from each other, a pilot sequence corresponding to each of the transmit antenna ports into orthogonal frequency division multiplexing (OFDM) symbols that are comprised in the pilot mapping corresponding to the transmit antenna port, wherein the pilot mapping indicates a location for inserting the pilot sequence in a plurality of time-frequency resources, wherein there is a one-to-one correspondence between the $N_t$ pilot sequences and the $N_t$ transmit antenna ports of the transmitter, wherein $N_t$ is a positive integer greater than or equal to 2, the pilot mappings corresponding to the transmit antenna ports are the same for the $N_t$ transmit antenna ports, and a length of each of the pilot sequences is greater than or equal to a product of a transmit antenna port quantity $N_t$ and a multipath quantity, and the multipath quantity is a multipath quantity of a radio channel between the transmitter and the receiver; and
the sender is configured to send the OFDM symbols into which the pilot sequence is inserted to a receiver.
10. The transmitter according to claim 9, wherein a quantity of the OFDM symbols comprised in the pilot mapping is $$M \le \frac{T_c}{T_{OFDM}},$$

wherein $T_c$ is a coherence time, $$T_c = \frac{1}{4D_s},$$

$D_s$ is a Doppler frequency shift, and $T_{OFDM}$ is OFDM symbol duration.

11. The transmitter according to claim 9, wherein a quantity of pilot elements of the pilot sequence that are inserted into each OFDM symbol is equal, and the quantity of the pilot elements is a ratio of a length of the pilot sequence to a quantity of the OFDM symbols comprised in the pilot mapping.

12. The transmitter according to claim 9, wherein a quantity of pilot elements of the pilot sequence that are inserted into each OFDM symbol is unequal.

13. The transmitter according to claim 12, wherein when the quantity of the pilot elements that are inserted into each OFDM symbol is equal, the programming instructions instruct the at least one processor to:
insert, according to the pilot mappings corresponding to the transmit antenna ports, the $n^{th}$ pilot element of the pilot sequence corresponding to each of the transmit antenna ports into the $q^{th}$ subcarrier of the $p^{th}$ OFDM symbol of the pilot mapping corresponding to the transmit antenna port, wherein $$P = \left\lfloor \frac{n-1}{N/M} \right\rfloor + 1$$

q=mod (n−1, N/M)+p, n=1, . . . , N, p=1, . . . , M, and q=1, . . . , $N_{FFT}$, wherein N is a length of the pilot sequence, M is the quantity of the OFDM symbols comprised in the pilot mapping, and $N_{FFT}$ is a quantity of subcarriers comprised in the pilot mapping.

14. A receiver, comprising: at least one processor, a memory, and a receiving device, wherein the memory is configured to store programming instructions for execution by the at least one processor, wherein
the programming instructions instruct the receiving device to receive orthogonal frequency division multiplexing (OFDM) symbols, wherein a pilot sequence is inserted into the OFDM symbols, and the OFDM symbols are sent by a transmitter;
the programming instructions instruct the at least one processor to:
extract, from the OFDM symbols according to pilot mappings corresponding to transmit antenna ports of the transmitter, pilot sequences superposed at the transmit antenna ports, wherein the pilot mappings indicate locations for inserting the pilot sequences in a plurality of time-frequency resources and the pilot mappings corresponding to the transmit antenna ports are the same among the transmit antenna ports, and a transmit antenna port quantity $N_t$ of the transmitter is a positive integer greater than or equal to 2;
identify, from the superposed pilot sequences, a pilot sequence corresponding to each of the transmit antenna ports, wherein the pilot sequences corresponding to the transmit antenna ports are different from each other and are orthogonal wherein the programming instructions instructing the at least one processor to identify the pilot sequence corresponding to each of the transmit antenna ports comprises programming instructions instructing the at least one processor to:
calculate, according to a tap coefficient, a quantity of subcarriers comprised in the pilot mapping, and the transmit antenna port quantity $N_t$, a pseudo inverse matrix corresponding to each of the transmit antenna ports, wherein the pseudo inverse matrix corresponding to each of the transmit antenna ports is orthogonal; and
identify, from the superposed pilot sequences according to the pseudo inverse matrix corresponding to each of the transmit antenna ports, the pilot sequence corresponding to each of the transmit antenna ports; and
perform channel estimation on each of the transmit antenna ports according to the pilot sequence corresponding to each of the transmit antenna ports, and wherein the programming instructions instructing the at least one processor to perform the channel estimation on each of the transmit antenna ports comprises programming instructions instructing the at least one processor to:
determine, a frequency domain transfer function of each of the transmit antenna ports according to the pilot sequence corresponding to each of the transmit antenna ports.

15. The receiver according to claim 14, wherein when calculating, according to the tap coefficient, the quantity of subcarriers comprised in the pilot mapping, and the transmit antenna port quantity $N_t$, the pseudo inverse matrix corresponding to each of the transmit antenna ports, the programming instructions instruct the at least one processor to:
calculate a matrix A according to the following formulas:

$$A[a_{m,n}] \text{ and } a_{m,n} = e^{\frac{-j2\pi mn}{N_{FFT}}},$$

wherein m=1, L, $N_{FFT}$, n=1, L, $N_{taps}$, $N_{FFT}$ is the quantity of the subcarriers comprised in the pilot mapping, and $N_{taps}$ is the tap coefficient of the receiver;
separately acquire the $K^{th}$ column of the matrixes $N_t$ to generate diagonal matrixes, and separately multiply the diagonal matrixes by the matrix A to obtain $N_t$ matrixes $B_k$, wherein k=1, L, Nt;
separately generate a generator matrix $C_k$ according to the matrix $B_k$, wherein $C_k=\{B_1, \ldots, B_k\}$; and
calculate, according to the following formula, a pseudo inverse matrix $D_k$ corresponding to each of the transmit antenna ports: $D_k=(C'_k*C_k)^{-1}*C'_k$, wherein $C'_k$ is a conjugate transpose matrix of the matrix $C_k$, and $(X)^{-1}$ represents inversion on a matrix x.

16. The receiver according to claim 14, wherein before calculating, according to the tap coefficient, the quantity of subcarriers comprised in the pilot mapping, and the transmit antenna port quantity $N_t$, the pseudo inverse matrix corresponding to each of the transmit antenna ports, the programming instructions instruct the at least one processor to:
acquire the quantity of the subcarriers comprised in the pilot mapping and the transmit antenna port quantity $N_t$.

* * * * *

UNITED STATES PATENT AND TRADEMARK OFFICE
CERTIFICATE OF CORRECTION

PATENT NO. : 10,135,589 B2
APPLICATION NO. : 15/255479
DATED : November 20, 2018
INVENTOR(S) : Yong Wang, Xiaohu Tang and Rui Ni Page 1 of 1

It is certified that error appears in the above-identified patent and that said Letters Patent is hereby corrected as shown below:

In the Claims

In Column 28, In Line 10 (approx.), In Claim 7, delete "$A[a_{m,n}]$" and insert -- $A=[a_{m,n}]$ --, therefor.

In Column 29, In Line 34-36 (approx.), In Claim 13, after "$P=\left|\frac{n-1}{N/M}\right|+1$" insert -- , --.

In Column 30, In Line 41 (approx.), In Claim 15, delete "$A[a_{m,n}]$" and insert -- $A=[a_{m,n}]$ --, therefor.

In Column 30, In Line 46 (approx.), In Claim 15, delete "$N_t$" and insert -- A --, therefor.

In Column 30, In Line 47 (approx.), In Claim 15, delete "generate" and insert -- generate $N_t$ --, therefor.

Signed and Sealed this
Tenth Day of March, 2020

Andrei Iancu
*Director of the United States Patent and Trademark Office*